United States Patent [19]

Yoshie et al.

[11] Patent Number: 5,210,391
[45] Date of Patent: May 11, 1993

[54] APPARATUS FOR MANUFACTURING METAL TUBE COVERED OPTICAL FIBER CABLE AND METHOD THEREFOR

[75] Inventors: Yasunori Yoshie; Takashi Tsukui, both of Tokyo, Japan

[73] Assignee: NKK Corporation, Tokyo, Japan

[21] Appl. No.: 730,915

[22] PCT Filed: Dec. 5, 1990

[86] PCT No.: PCT/JP90/01578
§ 371 Date: Jul. 29, 1991
§ 102(e) Date: Jul. 29, 1991

[87] PCT Pub. No.: WO91/08510
PCT Pub. Date: Jun. 13, 1991

[30] Foreign Application Priority Data

Dec. 5, 1989 [JP] Japan .................................. 1-314295
Jul. 20, 1990 [JP] Japan .................................. 2-190714

[51] Int. Cl.⁵ .............................................. B23K 26/08
[52] U.S. Cl. ........................... 219/121.63; 219/121.64; 228/148; 385/100
[58] Field of Search .................... 219/121.63, 121.64, 219/59.1, 67, 60.2, 61, 121.13, 121.14, 121.45, 121.46; 29/728; 228/17.5, 126, 127, 129, 147, 148; 385/100-114

[56] References Cited

U.S. PATENT DOCUMENTS

| | | | |
|---|---|---|---|
| 4,212,097 | 7/1980 | Portinari et al. | 385/109 |
| 4,477,147 | 10/1984 | Winter et al. | 385/111 |
| 4,555,054 | 11/1985 | Winter et al. | 228/148 |
| 4,611,748 | 9/1986 | Winter et al. | 385/100 |
| 4,711,388 | 12/1987 | Winter et al. | 228/148 |
| 4,759,487 | 7/1988 | Karlinski | 228/148 |
| 4,852,790 | 8/1989 | Karlinski | 228/148 |
| 4,878,733 | 11/1989 | Winter et al. | 385/102 |
| 4,896,997 | 1/1990 | Gaylin . | |
| 5,121,872 | 6/1992 | Legget | 228/148 |
| 5,143,274 | 9/1992 | Laupretre et al. | 228/148 |

FOREIGN PATENT DOCUMENTS

| | | | |
|---|---|---|---|
| 633623 | 12/1961 | Canada | 228/148 |
| 0127437 | 12/1984 | European Pat. Off. . | |
| 173655 | 3/1986 | European Pat. Off. | 219/121.63 |
| 54-2142 | 1/1979 | Japan | 385/109 |
| 57-64706 | 4/1982 | Japan | 385/101 |
| 60-111211 | 6/1985 | Japan . | |
| 60-208011 | 10/1985 | Japan . | |
| 61-22315 | 1/1986 | Japan . | |
| 64-35514 | 2/1989 | Japan . | |

Primary Examiner—Geoffrey S. Evans
Attorney, Agent, or Firm—Frishauf, Holtz, Goodman & Woodward

[57] ABSTRACT

An apparatus for manufacturing a metal tube covered optical fiber cable comprises an assembly of a plurality of roller pairs for forming a metal strip into a metal tube so that both side edge portions abut against each other, a laser (7) for welding the abutment portions with a laser beam to obtain a sealed metal tube (1c), an optical fiber guide for guiding an optical fiber (5) into the formed metal tube (1a), and a traction apparatus including a tension variable elements for continuously drawing a sealed metal tube (1d). The optical fiber guide is elastically urged against an inner wall opposite to an irradiated surface of the metal tube so that the optical fiber is protected even when the focal point of the laser beam is positioned below the abutment portions of the metal tube. In one embodiment a leaf spring mechanism is used to elastically urge the optical fiber guide.

45 Claims, 13 Drawing Sheets

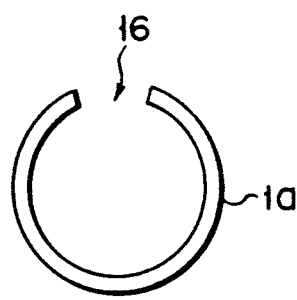
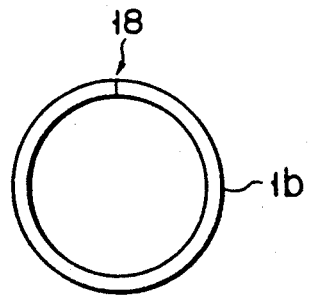
F I G. 2A   F I G. 2B
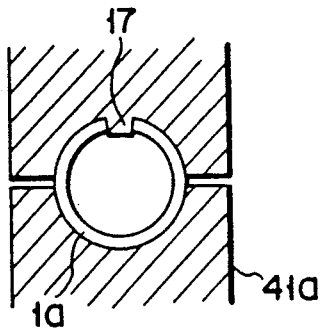 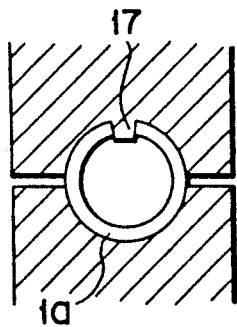 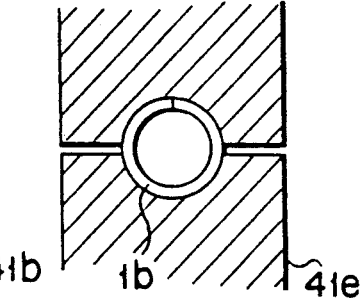
F I G. 3A   F I G. 3B   F I G. 3C
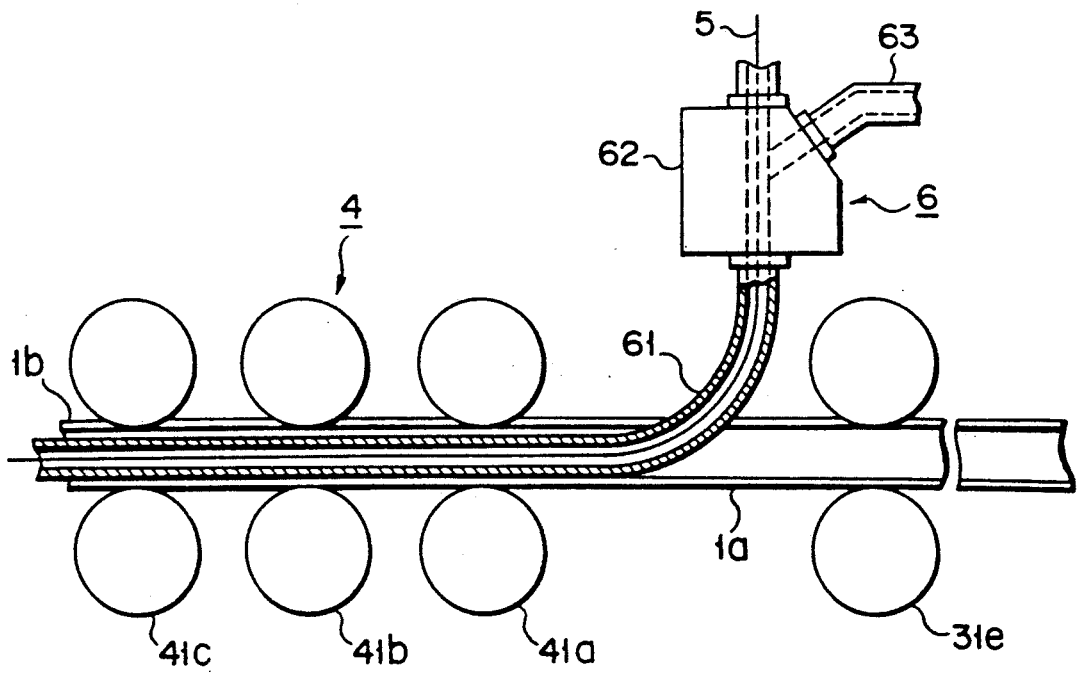
F I G. 4

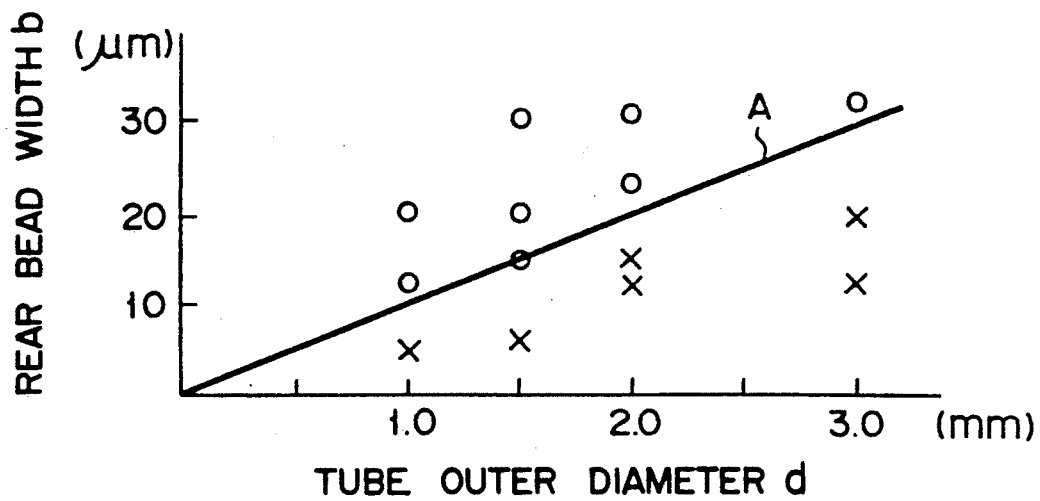
F I G. 9
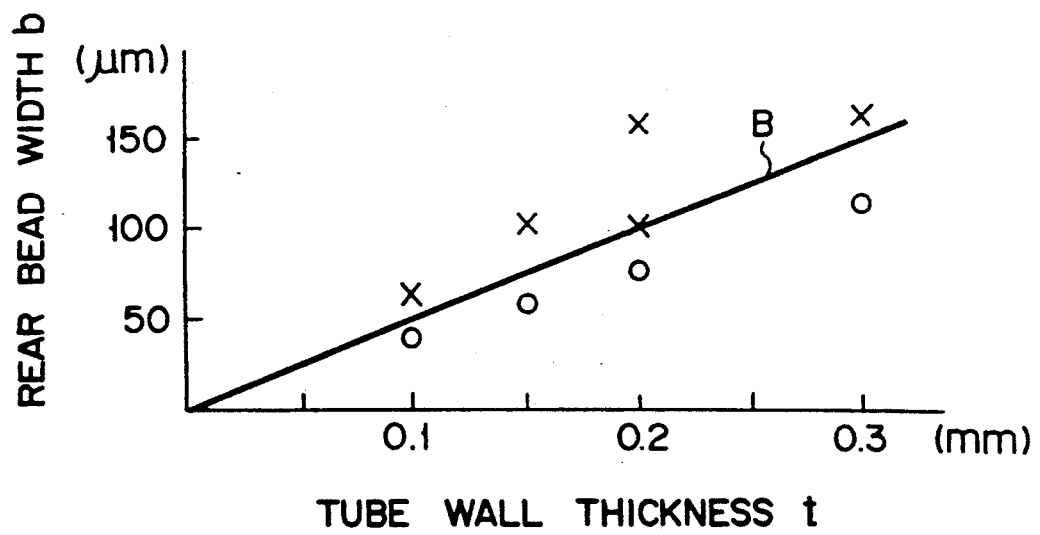
F I G. 10

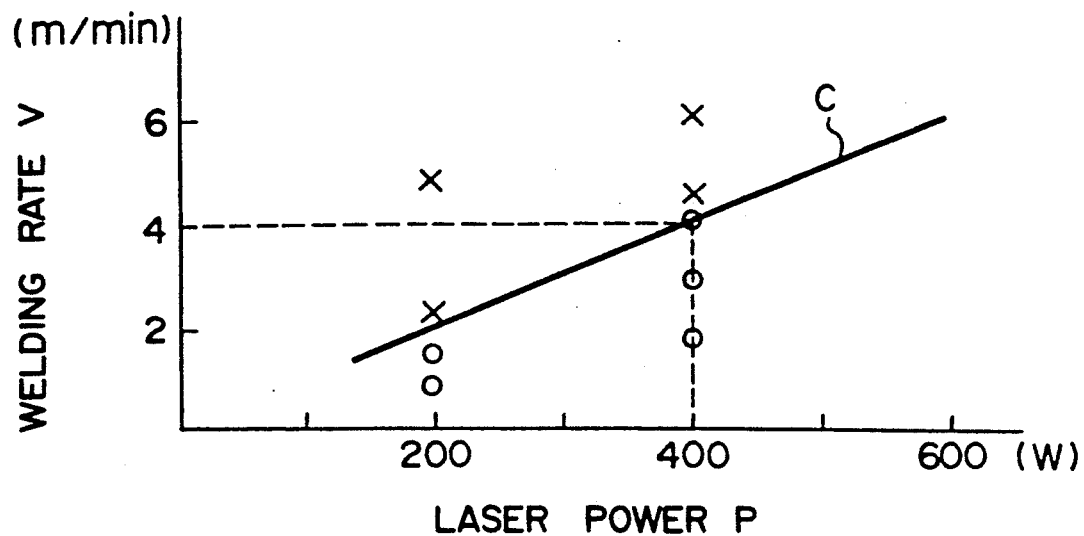
F I G. 11
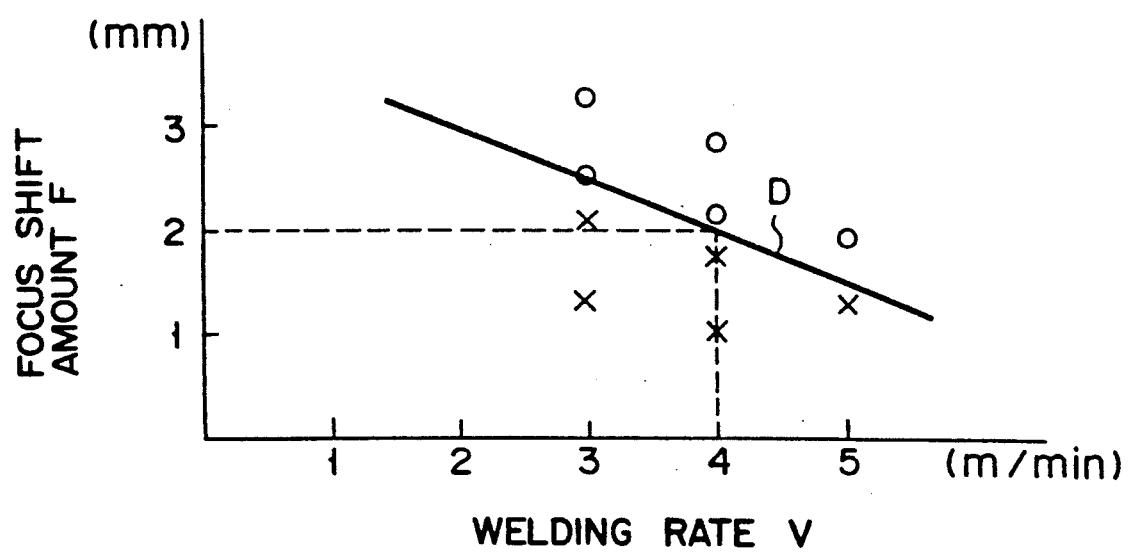
F I G. 12

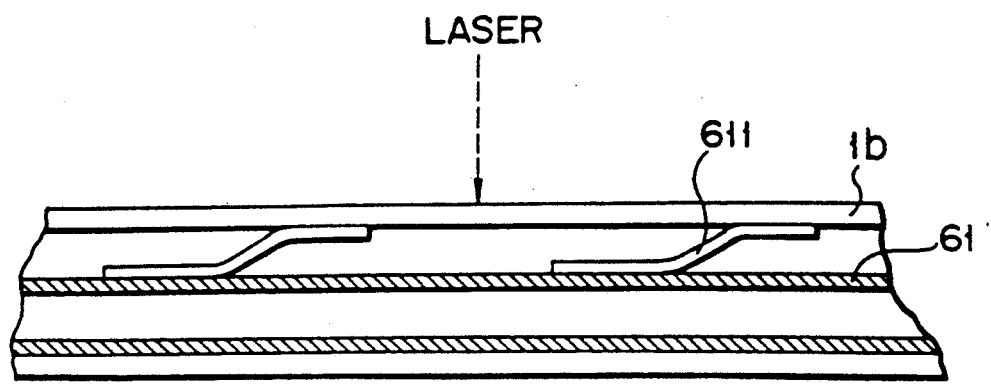
F I G. 19
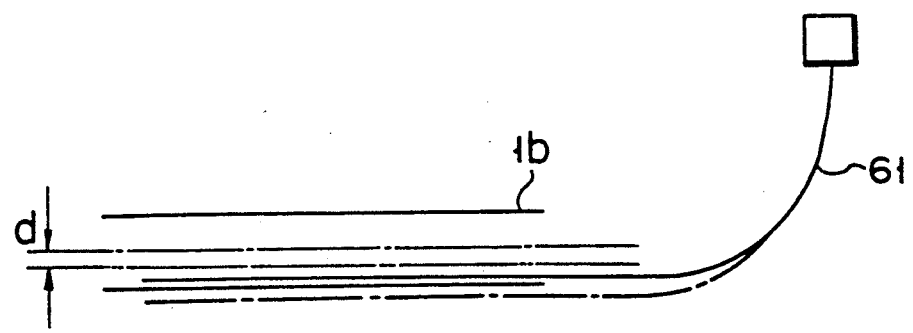
F I G. 20

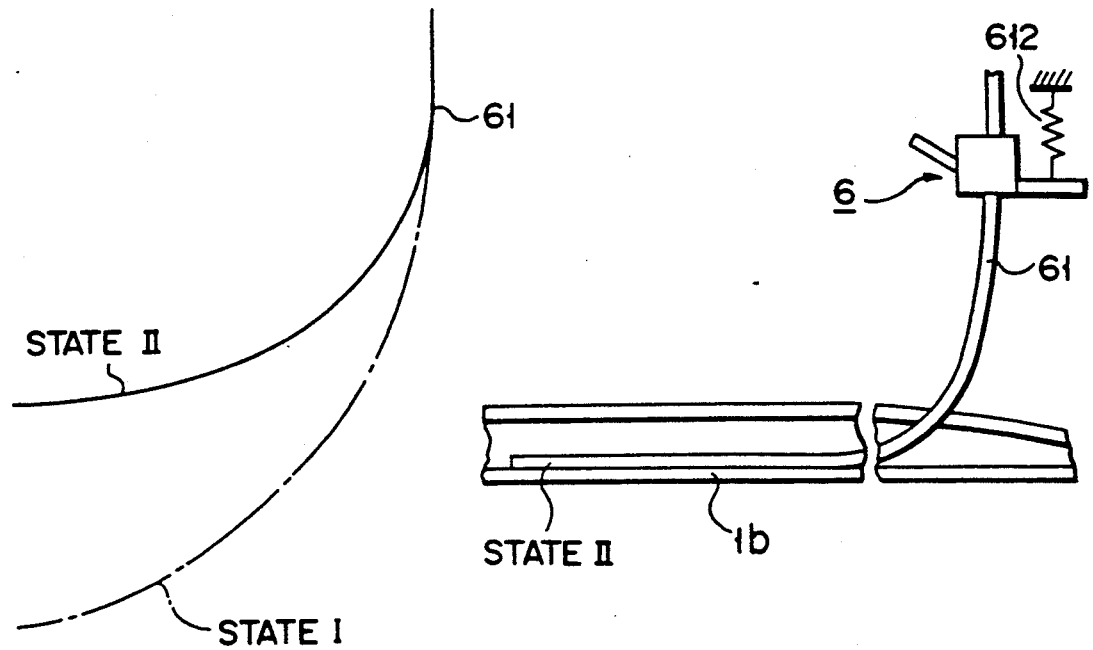
FIG. 21A
FIG. 21B
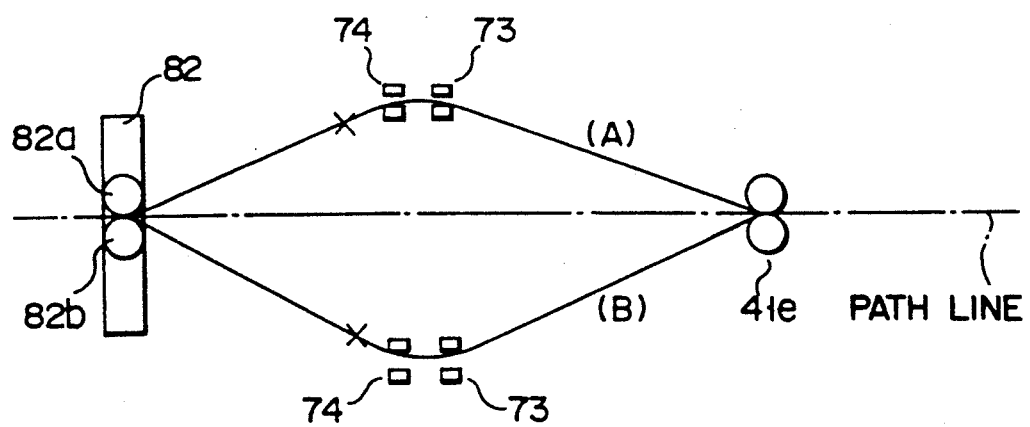
FIG. 22

APPARATUS FOR MANUFACTURING METAL TUBE COVERED OPTICAL FIBER CABLE AND METHOD THEREFOR

TECHNICAL FIELD

The present invention relates to an apparatus for manufacturing a metal tube covered optical fiber cable and a method therefor.

BACKGROUND ART

An optical fiber a bundle of optical fibers are variously modified in accordance with the conditions under which they are used. However, tension member must be used with an optical fiber to assure a high strength in some cases. When water permeates an optical fiber cable, its strength may be degraded. When an optical fiber cable is to be installed in the bottom of a sea or the bottom of the water, in order to assure a sufficient installation tension and a high water resistance, an optical fiber cable must be used in a jacket structure in which an optical fiber cable is covered with a thin metal tube.

When an optical fiber cable having a small diameter tube is used, an optical fiber is inserted into a metal tube having a longitudinal gap, and this gap is bonded by soldering.

According to this method, however, heat generated during bonding of the gap of the metal tube is applied to the optical fiber cable for a relatively long period of time to cause thermal damage.

In order to prevent this optical fiber cable from thermal damage, there is provided an apparatus and method of welding abutment portions of a metal tube with a focused laser beam to continuously manufacture a metal tube covered optical fiber cable, as disclose in Published Unexamined Japanese Patent Application No. 64-35514.

This apparatus for manufacturing the metal tube armored optical fiber cable forms a continuously fed flat metal strip into a metal tube having a longitudinal gap at a top portion. A guide tube is inserted into the optical fiber is guided into the metal tube through the guide tube. After the gap of the metal tube having received this optical fiber is closed, the metal tube is supplied to a laser welding unit.

The laser welding unit causes a guide roller to align the abutment edge portions of the top portion of the metal tube to each other. A laser beam having a focal point at a position outside the range of the abutment portions is radiated to weld the abutment portions. Since the laser beam is focused outside the range of the abutment portions, the abutment portions can be welded without protecting the optical fiber with a heat-shielding member.

This metal tube containing the optical fiber cable is drawn to have a predetermined outer diameter, and the drawn tube is continuously wound around a capstan.

During drawing of this metal tube, an inert gas is supplied to the guide tube to carry the optical fiber cable by the viscosity resistance of the gas. While the metal tube is kept engaged with the capstan, the optical fiber cable is blown outward against the inner surface of the metal tube, so that the length of the optical fiber cable is set larger than that of the metal tube. The optical fiber cable is not kept taut to prevent the optical fiber cable from stress caused by an installation tension or the like.

In order to protect the optical fiber cable from water entering from a hole formed in a damaged metal tube, a gel is injected inside the metal tube. More specifically, after the optical fiber cable is blown outward against the inner surface of the metal tube by the inert gas at the capstan, the gel is injected from a gel guide tube different from the guide tube for guiding the optical fiber cable.

In the above conventional apparatus for manufacturing a metal tube armored optical fiber cable, no heat-shielding member for protecting the optical fiber is used at the time of welding of the abutment portions of the metal tube, and the position of the guide tube for guiding the optical fiber cable is indeterminate. For this reason, the guide tube is located near the abutment portions of the metal tube. Therefore heat generated during laser welding is undesirably applied to the optical fiber cable to thermally damage the optical fiber cable. For example, when a temperature of the optical fiber cable near the abutment portions during laser welding is measured, a temperature near the optical fiber cable is increased to at least about 600° C. For this reason, a fine crystal nucleus is formed and is grown to undesirably cause a devitrification phenomenon in which a scattering loss is increased.

Sputter components are produced during welding. When the guide tube is close to the abutment portions, the sputter components deposited on the guide tube tend to be brought into contact with a rear bead of the welded portion. When the sputter components are brought into contact with the rear surface of the welded portion, the welded portion is thermally unbalanced to cause incomplete connection. In order to prevent this incomplete welding caused by the sputter components, when production of the rear bead portion as a sputter source is suppressed, a nonwelded portion is undesirably formed. When the guide tube is kept in contact with the abutment portions, the same phenomenon as in incomplete welding caused by the sputter components occurs. For these reasons, it is undesirably impossible to perform a continuous manufacturing operation (operation for manufacturing a long cable) in practice.

When a radiation power density of a laser beam is excessively high during laser welding, the metal tube is heated to a temperature exceeding its melting point and is partially evaporated or removed to form a hole in an irradiated portion. In order to prevent this, a laser beam is not conventionally focused within the range of the wall thickness of each abutment portion of the metal pipe, but is focused above the surface of the metal tube. When the laser beam is focused above the metal tube, the welded portion has a section in which the lower portion is sagged, so that a shrinkage hole and a crack tend to be formed inside the welded portion. In addition, an amount of sputter components is also increased, resulting in inconvenience.

When the abutment portions of the metal pipe are to be welded with a laser beam, the metal tube is guided by the guide roller, so that the abutment portions are positioned with respect to the focal point of the laser beam. During guiding of the metal tube along the guide roller, the metal tube tends to be fed in a zig-zag manner to degrade positioning of the abutment portions.

Optical fiber cables are used in a variety of application conditions and at various temperatures. The thermal expansion coefficient of the metal tube is much larger than that of the optical fiber cable. For this reason, when optical fiber cables are used at high temperatures, a tension acts on the optical fiber cable due to a difference in elongations of the metal tube and the optical fiber cable to damage the optical fiber cable. This also occurs when a cable is installed at a high tension, e.g., in installment at the bottom of a sea.

To the contrary, when optical fiber cables are used at low temperatures, the optical fiber cable is brought into contact with the inner wall surface of the metal tube having a large shrinkage amount due to a large difference between the degrees of shrinkage of the metal tube and the optical fiber cable. The optical fiber cable directly receives a side pressure from the inner wall of the metal tube. Irregular bending forces having short periods act on the optical fiber cable to cause a so-called microbend loss, thereby attenuating a signal transmitted through the optical fiber cable.

In order to prevent damage and the like, the optical fiber cable is blown outward against the inner wall surface of the metal tube while the metal tube is kept engaged with the capstan, so that the length of the optical fiber cable is set larger than that of the metal tube after the cable is straightened for use.

In this case, however, a difference between the length of the optical fiber cable and the length of the metal tube (to be referred to as an extra length hereinafter) is determined by the outer diameter of the capstan and a difference between the inner diameter of the metal tube and the outer diameter of the optical fiber cable. The extra length cannot be arbitrarily controlled, and the optical fiber cable may be damaged depending on application conditions.

As described above, while the metal tube is kept engaged with the capstan, the optical fiber cable is blown outward against the inner surface of the metal tube by an inert gas to provide an extra length to the optical fiber cable. For this reason, when a gel is to be injected into the metal tube, it must be injected while the optical fiber cable is kept blown outward against the inner wall of the metal tube due to the following reason. That is, even if the gel is injected and then the inert gas is supplied, the gel causes resistance to fail to give the extra length to the optical fiber cable. When a gel is to be injected, a gel guide tube is required in addition to the optical fiber cable and the inert gas guide tube. Since these two guide tubes must be simultaneously inserted into the metal tube, the inner diameter of the metal tube is increased. In order to obtain a thin tube from this tube, the drawing amount is increased. Metal tubes may not be occasionally thinned in accordance with diameters of optical fiber cables, resulting in inconvenience.

SUMMARY OF THE INVENTION

The present invention has been made to solve the above drawbacks, and has as its object to provide an apparatus for manufacturing a metal tube covered optical fiber cable and a method therefor, capable of preventing damage to an optical fiber cable during welding abutment portions of a metal tube, capable of continuing the manufacturing operation for a long period of time, and capable of arbitrarily obtaining an extra length.

There is provided an apparatus for manufacturing a metal tube covered optical fiber cable, comprising an assembly, having a plurality of roller pairs, for causing both side edges of a metal strip to abut against each other to form the metal strip into a metal tube, optical fiber guiding means for guiding an optical fiber or an optical fiber bundle into the formed metal tube, laser welding means for radiating a laser beam to abutment portions of the metal tube to bond the abutment portions to obtain a sealed metal tube, and drawing means for continuously drawing the metal strip, the formed metal tube, and the sealed metal tube incorporating the optical fiber or the optical fiber bundle through the assembly, the optical fiber guiding means, and the laser welding means, characterized by comprising tension adjusting means, arranged in the upstream of the assembly, for variably adjusting a tension of the metal strip on an assembly side and adjusting a tension of the metal tube, and tension adjusting means, arranged in the upstream of an optical fiber guide port in the optical fiber guiding means, for variably adjusting a tension of the optical fiber cable, the optical fiber guiding means being provided with a guide tube, inserted into the metal tube during formation thereof and elastically urged against an inner wall opposite to an irradiated surface of the metal tube at a radiation position of a laser beam, for guiding the optical fiber or the optical fiber bundle into the metal tube, and the traction means being provided with tension variable means for reducing a tension of the metal tube covered optical fiber cable.

The laser welding means is preferably arranged so that the laser radiation means positions a focal point of the laser beam to fall below the abutment portions of the metal tube.

A focal point shift amount (defocus amount) of the laser beam is preferably determined to fall within a predetermined range determined by a laser beam power and a welding rate which does not produce a non-welded portion.

The tension variable means is preferably constituted by a capstan around which the sealed metal tube is wound by a plurality of turns.

The laser welding means preferably comprises a guide shoe, located in relationship to a metal tube path line and having a groove engaged with the metal tube on one side, for positioning the abutment portions of the metal tube to the laser beam radiation position, and position adjusting means for finely adjusting the position of the guide shoe.

The inert gas supply tube or the gel guide tube is preferably connected between the optical fiber guide port of the guide tube and a metal tube insertion portion.

The tension adjusting means for adjusting the tension of the metal tube is preferably located in the downstream of the tension variable means.

There is provided a method of manufacturing a metal tube covered optical fiber cable according to the present invention comprising the forming step of forming a metal strip to be formed into a metal tube, the laser welding step of welding abutment portions of the metal tube to obtain a sealed metal tube, the optical fiber guide step of guiding an optical fiber or an optical fiber bundle in the metal tube, the traction step of winding the formed metal tube covered optical fiber cable, characterized in that a tension of the metal strip before the assembly step is set variable to adjust a tension of the metal tube, a tension of the optical fiber cable before the optical fiber guide step is set variable to adjust a tension of the optical fiber cable guided into the metal tube, and the tensions of the metal tube and the optical fiber cable are reduced in the traction step to perform traction of the metal tube covered optical fiber cable, and in the optical fiber guide step, a guide tube is inserted into the metal tube at the laser beam radiation position where the guide tube is urged against an inner wall opposite to the abutment portions of the metal tube, and the optical fiber or the optical fiber bundle is guided into the metal tube through the guide tube.

In the laser welding step, the abutment portions of the metal tube are located at a predetermined position with respect to a laser beam focal position by a guide shoe which is located in relationship to a path line and has a groove engaged with the metal tube on one side.

The laser beam focal position is preferably set so that the laser beam is focused below the abutment portions of the metal tube.

The focus point shift amount of the laser beam is set to fall within a predetermined range determined by a power of the radiation laser beam and a welding rate which does not produce nonwelded portions, and welding must be stably performed for a long period of time.

The guide tube is preferably inserted into the metal tube in which the optical fiber cable is inserted, thereby supplying an inert gas or a gel through the guide tube.

According to the present invention, the optical cable is guided into the covering metal tube by the guide tube also serving as a heat-shielding member. At the position where the guide tube is irradiated with the laser beam, the guide tube is elastically urged against the metal tube inner wall opposite to the abutment portions of the metal tube to reduce a thermal influence on the optical fiber cable. At the same time, the optical fiber cable is cooled by the inert gas blown into the guide tube.

Since the guide tube is located on the side opposite to the abutment portions of the metal tube at the laser welding portion, a gap is formed between the abutment portions and the guide tube to assure a space where sputter components produced during welding can be deposited.

When the abutment portions of the metal tube are to be welded with a laser beam, the metal tube is positioned while being urged by the engaging groove of the guide shoe and is guided while its zig-zag movement is suppressed. In addition, the guide shoe position is finely adjusted in correspondence with the focal position of the laser beam, so that the abutment portions of the metal tube are accurately and stably positioned. Furthermore, when the guide tube is to be located at a position opposite to the abutment portions of the metal tube at the welding portion, an elastic force acting on the guide tube can be increased.

The focal position of the laser beam for welding the abutment portions of the metal tube falls outside the abutment portions and is set inside the metal tube. A welding width can be set almost constant and a rear bead width can be minimized while an excessive increase in radiation power density of the laser beam can be prevented.

The focal point shift amount of the laser beam is set to fall within a predetermined range determined by the power of the radiation laser beam and the welding rate determined by the limit which does not produce nonwelded portions. Therefore, the rear bead width can be uniformed, and influences of the sputter components can be suppressed.

By utilizing a difference between an elongation amount corresponding to a difference between the tension of the metal tube in the upstream of the tension variable means and the tension of the optical fiber cable guided into the metal tube, the length of the optical fiber cable relative to the metal tube in the downstream of the tension variable means can be arbitrarily adjusted.

The tension variable means is preferably constituted by a capstan around which the sealed metal tube is wound by a plurality of turns. The number of turns of the sealed metal tube wound around the capstan is changed to adjust the difference between the tension of the sealed metal tube on the outlet side of the capstan and the tension of the optical fiber cable in the metal tube to an arbitrary value.

When an inert gas or gel is to be guided into the metal tube, it can be guided through the guide tube which guides the optical fiber cable therein. Only one guide tube is inserted into the metal tube, so that a thin metal tube can be used, and the diameter of the metal tube can be easily reduced in accordance with the diameter of the optical fiber cable.

BRIEF DESCRIPTION OF DRAWINGS

FIGS. 2A and 2B are sectional views showing a metal tube in different forming steps, FIGS. 3A, 3B, and 3C are side views showing forming roller pairs of a second assembly, FIG. 4 is a view showing an arrangement of an optical fiber guide means, FIGS. 7A and 7B show a tension variable means and a tension adjusting means, respectively, in which FIG. 7A is a plan view thereof, and FIG. 7B is a front view thereof, FIG. 9 is a graph showing a relationship between a tube outer diameter and a rear bead width, FIG. 10 is a graph showing a relationship between a tube wall thickness and a rear bead width, FIG. 11 is a graph showing a relationship between a laser power and a welding rate, FIG. 12 is a graph showing a relationship between a welding rate and a focal point shift amount, FIG. 19 is a view for explaining a leaf spring mechanism, FIG. 20 is a view for explaining a state wherein a metal tube is moved upward, FIG. 21A is a view for explaining a bent state of a guide tube, FIG. 21B is a view for explaining a guide tube positioning mechanism, and FIG. 22 is a view for explaining a metal tube state at a welding position.

DETAILED DESCRIPTION

Figure 1:
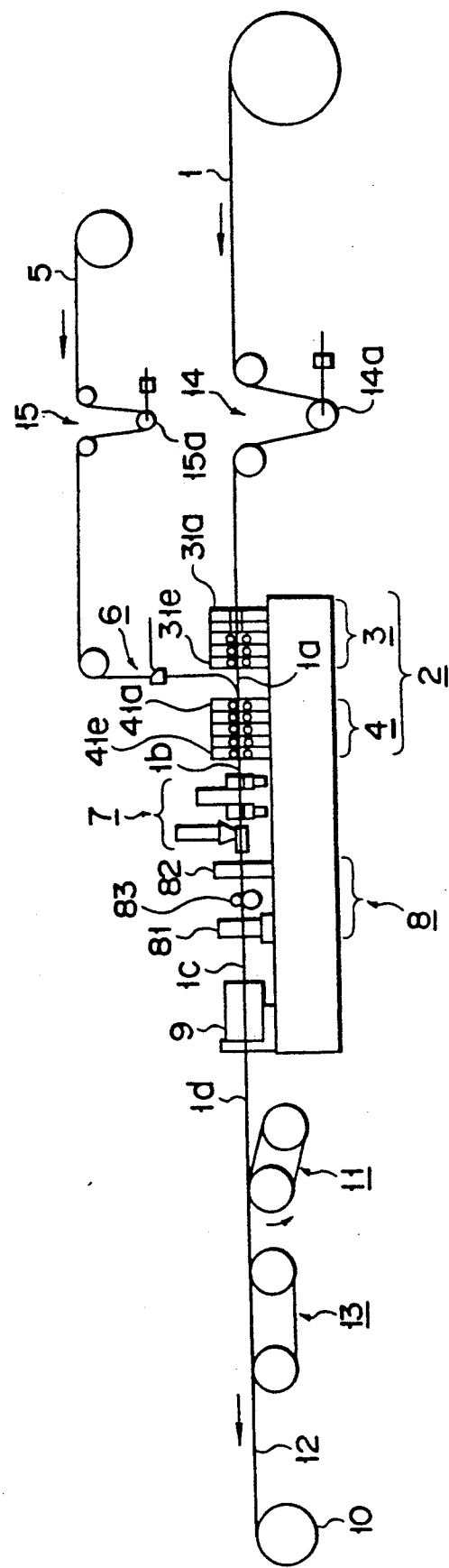
FIG. 1 is a view of an overall arrangement showing an embodiment of the present invention.

FIG. 1 is a view of an overall arrangement showing an embodiment of the present invention. As shown in FIG. 1, an apparatus for manufacturing a metal tube covered optical fiber cable comprises an assembly 2 constituted by first and second assemblies 3 and 4 for forming a metal strip 1 and forming the metal strip into a metal tube so as to abut both side edges of the strip, an optical fiber guide means 6, arranged between the first and second assemblies 3 and 4, for guiding an optical fiber cable 5 into the formed metal tube, and a laser welding means 7 arranged as the next stage of the assembly 2.

A measuring unit 8 and a drawing means 9 are arranged next to the laser welding means 7. A traction means comprising a tension variable means 11 and a tension adjusting means 13 for the metal tube covered optical fiber cable 12 is arranged between the drawing means 9 and a cable winding machine 10. The tension variable means 11, the tension adjusting means 13, and a tension adjusting means 14 for the metal strip 1 and a tension adjusting means 15 for the optical fiber cables, which latter two are arranged in the upstream of the assembly 2, constitute an extra length control means for controlling a so-called extra length, i.e., the length of the optical fiber cable relative to the metal tube. The first assembly 3 constituting the assembly 2 comprise a plurality (e.g., five) of roller pairs 31a to 31e continuously aligned with each other. The forming roller pairs 31a to 31e sequentially have different forming surfaces and form the continuously fed metal strip 1 into a substantially U-shaped metal tube 1a having a longitudinal gap at its top portion, as shown in a sectional view of FIG. 2A.

Similarly, the second assembly 4 comprises a plurality (e.g., five) of forming roller pairs 41a to 41e aligned with each other. As shown in FIGS. 3A, 3B, and 3C, fins 17 gradually reduced in size are formed in the upper rollers corresponding to the forming roller pairs 41a to 41d of the previous stages. A gap 16 of the metal tube 1a is engaged with each fin 17 so that the gap 16 is located at the top point of the metal tube 1a and the gap 16 is gradually reduced by the fins 17. Abutment portions 18 of the metal tube 1a are brought into contact with each other by the forming roller 41e of the last stage, thereby forming a metal tube 1b almost tightly closed at the abutment portions 18.

As shown in a partial sectional view of FIG. 4, the optical fiber guide means 6 comprises a guide tube 61 inserted into the metal tube 1b to guide the optical fiber cable 5, and an inert gas supply tube 63 connected to the guide tube 61 through a tube connector 62 and an inert gas supply tube connector 62.

The guide tube 61 is made of a metal excellent in thermal conductivity, such as copper or a copper alloy. The outer diameter of the guide tube 61 is smaller than the inner diameter of the metal tube 1b. The guide tube 61 is inserted from the gap 16 of the metal tube 1 between the first and second assemblies 3 and 4. A distal end of the guide tube 61 passes through the laser welding means 7 and is located in front of an eddy current probe 81 of the measuring unit 8. The distal end of the guide tube 61 is inserted in front of the eddy current probe 81 as described above because probe precision is adversely affected when the guide tube 61 reaches the eddy current probe 81.

When a probe measurement result is not adversely affected by insertion of the guide tube 61 passing through the eddy current probe 81, for example, when the diameter of the metal tube is large and the guide tube 61 is in contact with the inner wall surface of the metal tube at a position opposite to a probe position, the guide tube 61 may be inserted and reaches a position passing through the position of the eddy current probe 81, that is, it may be inserted in front of the drawing means 9.

The guide tube 61 can be provided with leaf spring mechanism 611 (FIG. 19) facing upward in front of and/or behind the laser beam radiation position of the laser welding means 7 and elastically contacting the inner wall surface of the metal tube 1b, or as shown in FIG. 20, the metal tube 1b can be located at a position higher by a predetermined distance in front of and/or behind the laser beam radiation position. Alternatively, a downward elastic force can be applied to the guide tube 61 itself to bring the guide tube 61 into contact with the inner wall of the metal tube 1b at a position opposite to the laser beam radiation position.

Elastic contact between the guide tube 61 and the inner wall of the metal tube 1b can be easily achieved, as shown in FIG. 21. The guide tube 61 is curved from a state I to a state II by elasticity of the guide tube 61 itself against the nature of straight extension of the guide tube 61 (FIG. 21(A)), the guide tube 61 is brought into contact with the inner wall of the metal tube 1b in the state II (FIG. 21(B)), and the optical fiber guide means 6 is fixed at an appropriately position to maintain a curved state. At this time, a positioning mechanism 612 constituted by a spring mechanism or the like is preferably added to the optical fiber guide means 6, as needed.

When the metal tube 1b is to be located at a position higher by the predetermined distance in front of the laser beam radiation position, a positioning unit 71 (to be described later) is finely adjusted. On the other hand, when the guide tube 61 is located at a position higher by the predetermined distance behind the laser beam radiation position, a support roll stand 82 (to be described later) is finely adjusted.

Figure 5:
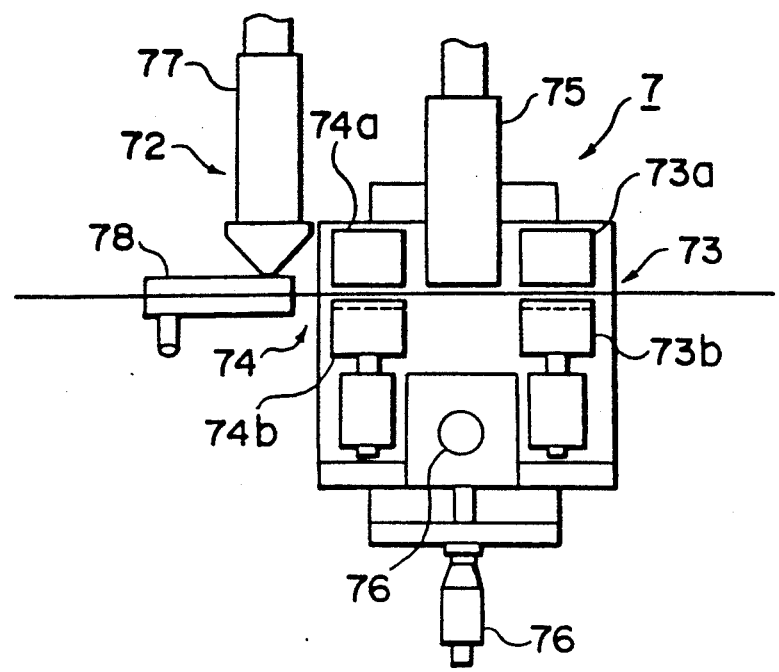
FIG. 5 is a view showing an arrangement of a laser welding means.

As shown in the arrangement of FIG. 5, the laser welding means 7 comprises a positioning unit 71 for positioning the metal tube 1b and a laser welding unit 72.

The positioning unit 71 comprises, e.g., two sets of guide shoes 73 and 74, a CCD seam monitor 75 arranged between the guide shoes 73 and 74, and micrometers 76 for finely adjusting vertical and horizontal positions of the guide shoes 73 and 74.

Figure 6:
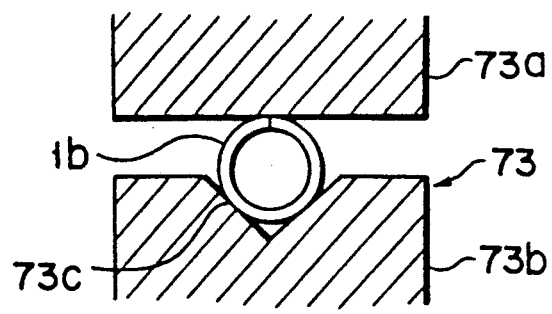
FIG. 6 is a side view showing a guide shoe.

The guide shoe 73 (74) comprises an upper shoe 73a view of FIG. 6. The upper shoe 73a (74a) has a flat surface which is brought into contact with the metal tube 1b. The lower shoe 73b (74b) has, e.g., a V-shaped groove engaged with the metal tube 1b and is biased upward by a spring.

The laser welding unit 72 comprises a laser radiation means 77, and a gas seal means 78 for sealing a welding position of the metal tube 1b with an inert gas such as argon gas.

The laser radiation means 77 is connected to, for example, a carbon dioxide laser device, guides and focuses a laser beam through an optical system, and emits the focused laser beam on the surface of the metal tube 1b at an angle of about 90°. A focal point of the laser beam radiated on the surface of the metal tube 1b is adjusted to be located at a position below the abutment portions 18 of the metal tube 1b, i.e., a position inside the metal tube 1b.

The measuring unit 8 arranged next to the laser welding means 7 comprises a support roll stand 82, a speedometer 83, and the eddy current probe 81 and checks a welded state or the like.

The drawing means 9 comprises a roller die and draws a welded and sealed metal tube 1c to have a predetermined outer diameter, thereby obtaining a thin metal tube 1d corresponding to the outer diameter of the optical fiber cable 5.

Figure 7A:
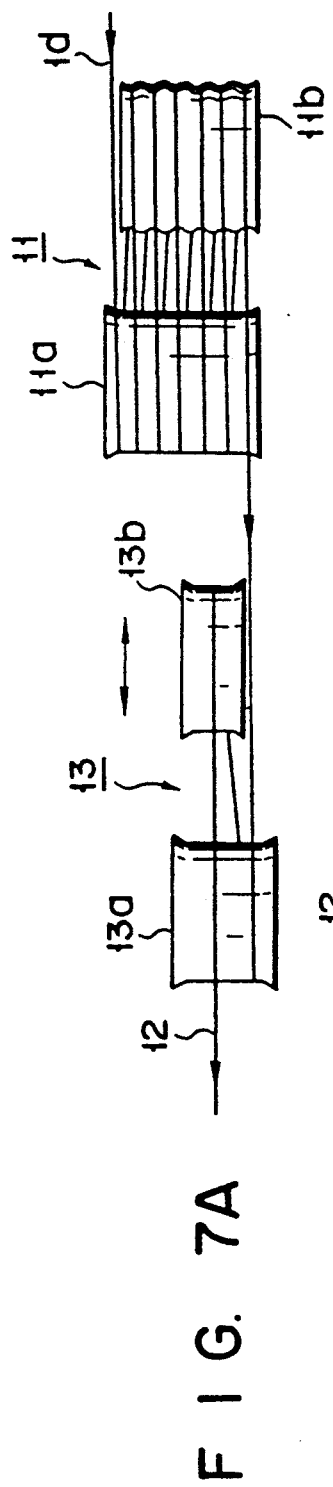
Figure 7B:
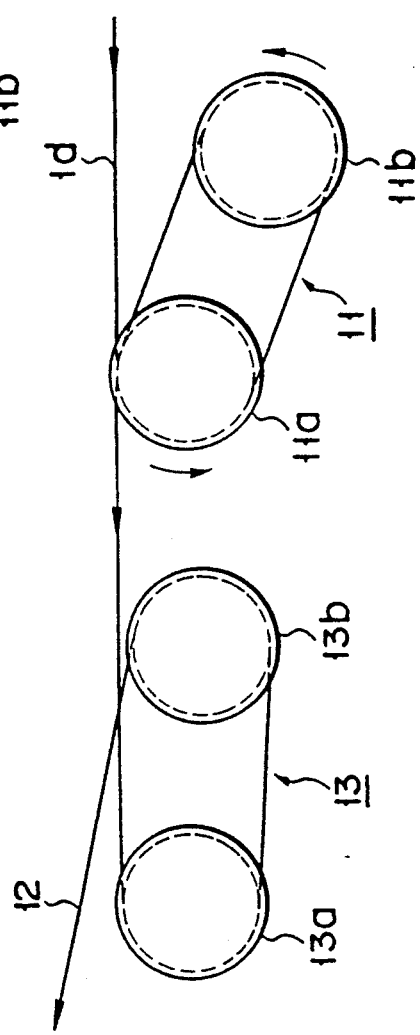

The tension variable means 11 arranged in the upstream of the drawing means 9 comprises a capstan having, e.g., a pair of rolls 11a and 11b, as shown in FIGS. 7A and 7B. The surface of one roll 11a is formed smooth, and the surface of the other roll 11b has a plurality of grooves. The metal tube 1d is wound around the capstan without overlapping the turns of the metal tube 1d. Similarly, the tension adjusting means 13 comprises a dancer roll stand having a pair of rolls 13a and 13b. One roll 13b is moved in a direction indicated by an arrow to change a distance between the rolls 13a and 13b so that the tension is adjusted, thereby adjusting a tension of the metal tube covered optical fiber cable 12 downstream of the capstan 11.

The tension adjusting means 14 and 15 for adjusting the tension of the metal strip 1 fed to the assembly 2 and the tension of the optical fiber cable 5 supplied to the optical fiber guide inlet of the guide tube 61 comprise dancer stands, respectively. The tensions of the dancer stands 14 and 15 are variably adjusted by moving weights linked to pulleys 14a and 15a engaged with the metal strip 1 and the optical fiber cable 5.

An operation of manufacturing the metal tube covered optical fiber cable 12 by the manufacturing apparatus having the above arrangement will be described in an order of manufacturing steps.

(1) Forming Step

The metal strip 1 is continuously supplied while the metal strip 1 is adjusted by the dancer stand 14 to have a predetermined tension. The first assembly 3 of the assembly 2 forms the supplied metal strip 1 into the metal tube 1a having the longitudinal gap 16 at the top portion. The metal tube 1a is supplied to the second assembly 4, and the gap 16 is sequentially engaged with the fins 17 of the forming roller pairs 41a, 41b and is gradually reduced. The gap 16 is eliminated by the forming roller pair 41e of the last stage, so that the abutment portions 18 are perfectly closed, thereby obtaining the metal tube 1b. When the metal tube 1b passes through the last forming roller pair 41e, a small gap 18a (to be described later) is actually formed between the abutment portions 18. The gap 18a was not changed in a path from the forming roller pair 41e to the laser beam radiation position, as detected by an another CCD monitor (not shown).

(2) Optical Fiber Cable Insertion Step

Meanwhile, the optical fiber cable 5 adjusted by the dancer stand 15 to have a predetermined tension is continuously supplied through the guide tube 61 which has been inserted from the gap 16 of the metal tube 1a between the first and second assemblies 3 and 4. At the same time, argon gas is supplied to the guide tube 61 from the inert gas supply tube 63 connected to the guide tube 61.

(3) Laser Welding Step

The metal tube 1b inserted into the guide tube 61 is supplied to the laser welding means 7. Since the metal tube 1b supplied to the laser welding means 7 is positioned by the fins 17 of the forming roller pairs 41a and 41b, the abutment portions 18 can be perfectly aligned with the position of the laser beam emitted from the laser beam radiation means 77.

The metal tube 1b supplied to the positioning unit 71 of the laser welding mean 7 is engaged with and guided along the grooves of the guide shoes 73 and 74. Lateral shifts, rotation and zig-zag movement of the metal tube 1b can be prevented. The positional deviations of the abutment portions 18 were observed on the CCD monitor 75. When a guide roller was used, the abutment portions 18 were moved within the range of ±100 μm due to torsion. However, when the guide shoes were used, the abutment portions were moved by only ±15 μm.

Subsequently, the CCD seam monitor 75 continuously detects the positions of the abutment portions 18 of the metal tube 1b, and the micrometer 76 is automatically or manually operated in accordance with a detection result to move the guide shoes 73 and 74, thereby finely adjusting that the abutment portions 18 are located at a predetermined position with respect to the focal point of the laser beam.

The role of the positioning unit 71 will be described below. As previously described, the guide shoes 73 and 74 in the positioning unit 71 prevent rotation and zig-zag movement of the metal tube 1b and guide, to the laser beam radiation position, the abutment portions 18 accurately positioned by the rollers 41a to 41d with fins with respect to the laser radiation position without causing zig-zag movement of the metal tube 1b. As previously described, it is possible to move the metal tube 1b upward by a predetermined distance in front of the laser beam radiation position upon adjustment of the positioning unit 71. As a result, elastically tight contact between the guide tube 61 and the inner wall surface of the metal tube 1b can be performed to minimize an adverse influence of laser welding (to be described later) and allow a continuous manufacturing operation for a long period of time.

As shown in FIG. 22, the positioning unit 71, i.e., the metal tube 1b is moved upward or downward by a predetermined distance or more (within the limit of elasticity) with respect to a path line by using the support rolls 82a and 82b of the support roll stand 82 and the final forming roller pair 41e as two support points, so that the metal tube 1b constitute two sides of a substantial triangle.

At this time, a light tension acts on the metal tube 1b located between the support roll stand 82 and the final forming roller pair 41e. This indicates that the positioning unit 71 also serves as a means for adjusting a tension of the metal tube (particularly 1c and 1d) as in the tension adjusting means 14 for the metal strip (to be described in detail later). Vibrations of the metal tube 1b at the laser welding position (marks X in FIG. 22) can be suppressed.

In practice, another CCD monitor (not shown) was located at a position inclined from the laser radiation position by 90° with respect to the CCD seam monitor 75 and the path line as the center, and vertical vibrations of the metal tube 1b were observed. As a result, when the guide shoes 73 and 74 in the positioning unit 71 are open, the metal tube 1b was vibrated in the range of about ±100 μm to about ±150 μm. However, when the metal tube 1b was fixed by the guide shoes 73 and 74, the metal tube 1b was vibrated within the range of about ±20 to about ±30 μm. When the positioning unit 71 is adjusted as indicated by a state (A) or (B) in FIG.

22, the metal tube 1b was confirmed to be vibrated within the range of about ±5 μm.

When the elastic contact between the guide tube 61 and the inner wall surface of the metal tube 1b is taken into consideration, the positioning unit 71 is more preferably adjusted in the state (A) than the state (B).

With the above adjustment operations, highly precise welding control can be performed, adverse welding influences can be minimized, a long-term operation is allowed.

The metal tube 1b having abutment portions 18 whose positions are adjusted is supplied to the laser welding unit 72. The laser welding unit 72 radiates a laser beam from the laser radiation means 77 to weld the abutment portions 18 while supplying argon gas from the gas seal means 78 to the abutment portions 18 of the metal tube 1b. The inner surface of this welded portion is sealed by argon gas flowing within the guide tube 61 and reversely flowing from the distal end of the guide tube 61.

Before and after the laser beam radiation position, the guide tube 61 which guides the optical fiber cable 5 is located in elastic contact with the inner wall of the metal tube 1b at a position opposite to the laser beam radiation position, and a gap is formed between the inner surfaces of the abutment portions 18 and the guide tube 61. The optical fiber cable 5 is shielded from heat by means of this gap and the guide tube 61, thereby minimizing the thermal influence on the optical fiber cable 5. In addition, the optical fiber cable 5 is cooled by the argon gas flowing in the guide tube 61 and the argon gas reversely flowing from the guide tube 61, thereby minimizing a temperature rise of the optical fiber cable 5.

For example, when the guide tube 61 was in contact with the abutment portions 18 at the laser radiation position, the temperature near the optical fiber cable 5 heated to a temperature of 600° C. or more can become about 115° C. to about 135° C. due to the presence of the gap. When argon gas flowed in the guide tube 61, the temperature was further reduced to about 100° C.

When the above gap is formed, an adverse influence on welding, which is caused by sputter components deposited on the guide tube 61, can be lagged. Therefore, welding can be stably performed for a long period of time.

Since the laser beam emitted from the laser radiation means 77 is adjusted so that the focal position of the laser beam is set inside the metal tube 1b, an excessive increase in power density of the laser beam incident on the abutment portions 18 can be prevented, and stable welding can be performed.

When the focal position is focused inside the metal tube 1b, and once a cavity is formed, a beam reflected by a cavity wall is focused toward the bottom of the cavity, so that a deep cavity is formed. A welding width can be set to be almost constant, and a rear bead width can be made small.

When the focal point shift amount of the laser beam is set to be a predetermined value, the rear bead width can be reduced, and sputter influences can be suppressed.

A minimum value $b_{min}$ of the rear bead width is determined by a condition that nonwelded portions are not left in the abutment portions 18. A maximum value $b_{max}$ of the rear bead width is determined by the limit in which sputter influences do not occur in a long-term operation.

Figure 8:
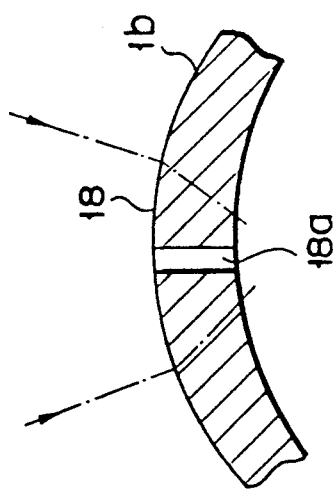
FIG. 8 is a view showing abutment portions of a metal tube.

Although the metal tube 1b is held by the guide shoes 73 and 74 at the position of the laser welding means 7, the small gap 18a is formed between the abutment portions 18 of the metal tube 1b by a spring back at the position of the laser welding portion 72, as shown in FIG. 8. The spring back which forms this small gap is influenced by rigidity of the metal tube 1b, i.e., an outer diameter d of the formed metal tube 1b. For example, a relationship between the outer diameter d (mm) and the rear bead width b (μm) is examined and shown in FIG. 9 when a laser beam having a power of 400 (W) is incident in the small gap 18a while the metal tube 1b consisting of Fe-group stainless having a longitudinal modulus of elasticity of 18,000 (kg/cm$^2$) is perfectly fixed. The tube outer diameter d is plotted along the abscissa in FIG. 9, and the rear bead width b is plotted along the ordinate. Referring to FIG. 9, a circle indicates a portion where a nonwelded portion is not formed, and a cross indicates a portion where a nonwelded portion is formed. Therefore, a straight line A indicates the limit at which nonwelded portions are not formed. The straight line A is given as $b = 10d$.

In an actual apparatus, according to the observation with the CCD seam monitor 75, a relative vibration of about ±5 (μm) was found to occur between the laser beam and the small gap 18a due to small vibrations of the apparatus.

The minimum width $b_{min}$ of the rear bead becomes $10d + 5$ (μm). For example, when the outer diameter of the metal tube 1b is 1 (mm), the minimum width $b_{min}$ of the rear bead becomes 20 (μm).

The minimum width $b_{min} = 10d \pm 5$ of the rear bead is exemplified with use of the metal tube 1b consisting of Fe-group stainless having the longitudinal modulus of elasticity of 18,000 (kg/mm$^2$). However, when Fe-goupr stainless or an Ni-group alloy having a longitudinal modulus of elasticity of more than 18,000 (kg/mm$^2$) is used, the rear bead width is set to be larger than the minimum width $b_{min}$, and good welding free from the nonwelded portions can be performed.

The limit free from the sputter components even in a long-term operation is determined by a shape of a welding portion. A relationship between a tube wall thickness t (mm) and the rear bead width b (μm) is shown in FIG. 10 when a laser beam having a power of 400 (w) is emitted in the small gap 18a to perform welding. The tube wall thickness t is plotted along the abscissa of FIG. 10, and the rear bead width is plotted along the ordinate. Referring to FIG. 10, a circle indicates a state wherein no sputter influence is found and welding can be continuously performed for a long period of time, e.g., 10 hours. A cross indicates a state wherein the sputter influence occurs and welding cannot be performed for a long period of time. The long period of time, i.e., 10 hours corresponds to a maintenance timing in an actual operation. This time does not indicate the limit time free from the sputter influence.

A straight line B indicates the limit free from the sputter influence even in an operation for a long period of time and is represented by $b = 1000(t/2)$. When the tube wall thickness t is 0.1 (mm), an allowable maximum width $b_{min}$ of the rear bead width can be 50 (μm).

As described above, when the laser beam having a power of 400 (W) is used, and the metal tube 1b has a wall thickness of 0.1 (mm) and an outer diameter of 1 (mm), the width b of the rear bead is controlled to fall within the range of 20 to 50 (μm) to perform welding. The sputter influence can be suppressed even if welding is performed for a long period of time. Therefore, welding free from defects can be continuously performed.

Since the minimum value $b_{min}$ of the rear bead width is determined under the condition that nonwelded portions are not left in the abutment portions 18, the minimum value is determined by an output density of a laser beam incident on the metal tube 1b. This output density is associated with a welding rate V. The power P of the laser beam and the welding rate V are changed to perform welding in a condition where the minimum value $b_{min}$ is larger than or equal to about $10d+5$ ($\mu$m), and in a condition that the minimum value is smaller than $10d+5$ ($\mu$m). These test results are shown in FIG. 11. The laser power P (W) is plotted along the abscissa, and the welding rate V (m/min) is plotted along the ordinate in FIG. 11. Referring to FIG. 11, a circle indicates a case which satisfies the above condition, and a cross indicates a case which does not satisfy the above condition. This limit is indicated by a straight line C.

The limit free from the sputter influence in an operation for a long period of time is associated with a welding depth, i.e., a laser beam focal point shift amount (defocus amount). The welding rate V and a focal point shift amount F (absolute value) are changed to perform welding in a condition that the maximum value $b_{max}$ of the rear bead width is equal to or smaller than $1000(t/2)$ and in a condition that the maximum value is larger than $1000(t/2)$. The test results are shown in FIG. 12. The welding rate V (m/min) is plotted along the abscissa in FIG. 12, and the focal point shift amount F (mm) is plotted along the ordinate. Referring to FIG. 12, a circle indicates a case which satisfies the above condition, and a cross indicates a case which does not satisfy the above condition. This limit is indicated by a straight line D.

For example, when a laser beam having a power of 400 (W) is used, a maximum welding rate $V_{max}$ for welding free from nonwelded portions is 4 (m/min) from FIG. 11. A minimum value of the focal point shift amount F free from the sputter influence at this welding rate is 2 (mm) from FIG. 12. When the laser power P is 400 (W), the welding rate V is set to 4 (m/min) and the focal point shift amount F is set to 2 (mm), long-term welding free from the sputter influence can be performed while the rear bead width b is kept small.

The small gap 18a between the abutment portions 18 of the metal tube 1b is slightly changed in accordance with an extra length control condition described separately and the method of setting the positioning unit 71 (A and B in FIG. 22). For example, when the state A in FIG. 22 is set, the size of the small gap 18a is increased. However, when the state B in FIG. 22 is set, the size tends to be reduced.

In practice, within the measurement mesh range of the present application, however, an influence of a change in the small gap 18a was found to rarely influence the welding result.

(4) Measurement and Drawing Step

The sealed metal tube 1c having the welded abutment portions 18 by focal shift (defocusing) welding, as described above, is supplied to the measurement unit 8. In the measurement unit 8, the passing speed, i.e., the welding rate V, of the metal tube 1c is measured by the speedometer 83 while the metal tube 1c is supported by the support roll stand 82. The welded state is checked by the eddy current probe 81.

The metal tube 1c passing through the eddy current probe 81 is drawn by the drawing means 9 to have a diameter corresponding to the outer diameter of the optical fiber cable 5 incorporated in the metal tube 1c, thereby obtaining the metal tube covered optical fiber cable 12. During drawing of the metal tube 1c by the drawing means 9, since only one guide tube 61 is inserted into the metal tube 1c just at the inlet side of the eddy current probe 81 and since the guide tube 61 does not extend up to the drawing means 9, metal tube 1c can be made thin, and the diameter of the metal tube 1c can be easily reduced.

(5) Traction and Winding Step

The metal tube covered optical fiber cable drawn by the drawing means 9 is wound by the cable winding machine 10 through the tension variable means 11 and the tension adjusting means 13.

When the metal tube covered optical fiber cable 12 is to be wound, the sealed and diameter-reduced metal tube 1d must be engaged with the optical fiber cable 5. For this purpose, prior to a continuous operation, after the welded and sealed metal tube 1d is manually wound around the capstans 11a and 11b of the tension variable means 11 by a plurality of times, it is subjected to traction. The distal end of the metal tube 1d is mounted on the cable winding machine 10 through the tension adjusting means 13. In this state, the distal end of the optical fiber cable 5 is inserted just in front of the capstan 11a, and the metal tube 1d is pressed at this position, thereby engaging the optical fiber cable 5 with the inner wall of the metal tube 1d. Thereafter, the metal tube 1d is wound while the capstans 11 are driven. The optical fiber cable 5 together with the metal tube 1d is pulled from the guide tube 61, thereby winding the pulled product as the metal tube covered optical fiber cable 12. In the case where the optical fiber cable 5 and the metal tube 1d can be wound together around the capstan 11a, it is not necessary to engage the optical fiber cable 5 with the metal tube 1d by pressing that tube.

(6) Extra Step

When the metal tube covered optical fiber cable 12 is wounded around the capstans 11a and 11b and is subjected to traction, a tension acts due to a frictional force between the metal tube 1d of the metal tube covered optical fiber cable 12 and the capstans 11a and 11b. This frictional force is large at the initial period of winding and is gradually reduced. The tension is also large at the initial period of winding and is gradually reduced, accordingly. Elongation occurs in a wound portion of the metal tube 1d in correspondence with the tension.

Assume that, in a normal operation, the stainless steel strip 1 having a width of 4 mm and a thickness of 0.1 (mm) is used, that the strip 1 is formed into a metal tube 1c having an outer diameter of 1.3 (mm), and that the metal tube 1c is drawn into the metal tube 1d having an outer diameter of 1.0 (mm). In this case, when a tension of the metal strip 1 is adjusted by the tension adjusting means 14 such that a tension of the metal tube 1c at the inlet of the capstan 11a is set to about 20 (kgf), the tension causes elongation of the metal tube 1d by +0.30%. At this time, when the tension of the optical fiber cable 5 having an outer diameter of 125 ($\mu$m) is adjusted by the tension adjusting means 15 and a tension of about 25 (gf) acts on the inlet side of the capstan 11a, elongation occurs by +0.03%.

Figure 13:
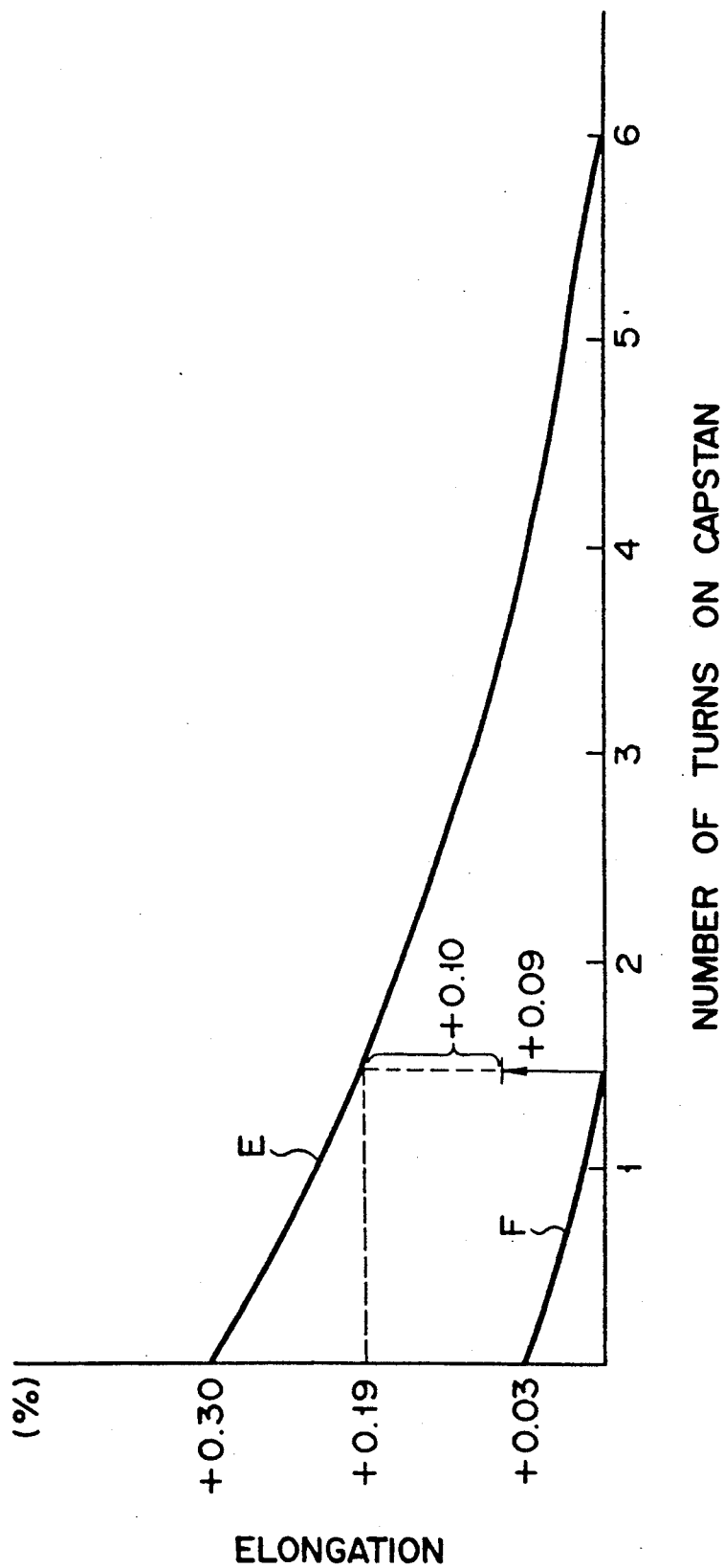
FIGS. 13, 14, and 15 and FIG. 16 are views for explaining extra length control operations.

Degrees of elongation of the metal tube 1d and the optical fiber cable 5 are measured as a function of the number of turns of the metal tube 1d wound around the capstans 11a and 11b. The measurement results are shown in FIG. 13. The number of turns of the tube wound around the capstans 11a and 11b is plotted along the abscissa, and an elongation (%) of the metal tube 1d is plotted along the ordinate. Referring to FIG. 13, a curve E represents characteristics of changes in elongation of the metal tube 1d, and a curve F represents characteristics of changes in elongation of the optical fiber cable 5. As indicated by the curve E, when the metal tube 1d is wound around the capstans 11a and 11b six times, the final elongation of the metal tube 1d supplied to the tension adjusting means becomes very small. As indicated by the curve F, when the optical fiber cable 5 is wound one and a half times, elongation is almost zero.

When the elongation of the optical fiber cable 5 becomes almost by its 1.5-time winding, an elongation of +0.19 is present in the metal tube 1d. Immediately after the metal tube 1d is wound around the capstans 11a and 11b six times, the tension of the metal tube 1d becomes almost zero. In this case, the elongation of the metal tube 1d becomes almost zero accordingly. That is, when the tube wound around the capstans six times, the metal tube 1d shrinks by 0.19% as compared with 1.5-time winding. On the other hand, since the tension of the optical fiber cable is almost zero upon 1.5-time winding, no change in elongation occurs, and the length of the optical fiber cable is kept unchanged. For this reason, 6-time winding causes an elongation of 0.19% in the optical fiber cable 5 as compared with the metal tube 1d.

The winding diameter of the metal tube 1d wound around the capstans 11a and 11b is different from that of the optical fiber cable 5 engaged with the inner wall of the metal tube 1d. For this reason, when the diameter of each of the capstans 11a and 11b is about 500 mm, the optical fiber cable 5 has an elongation amount corresponding to +0.09% with respect to the metal tube 1d. This elongation amount of 0.09% is canceled with the above 0.19%. As a result, the optical fiber cable 5 is longer than the metal tube 1d by 0.10%.

Assume that the tension of the metal tube 1d at the inlet side of the capstan 11a is the same as that shown in FIG. 13, and that the tension of the optical fiber cable 5 is changed to increase the tension at the inlet side of the capstan 11a. In this case, a change in elongation of the optical fiber cable 5 is indicated by a curve F1 in FIG. 14. When the optical fiber cable 5 is wound around the capstans 11a and 11b 3.5 times, the tension is almost zero. On the other hand, the elongation of the metal tube 1d is 0.09% in 3.5-time winding. When the elongation of 0.09% of the metal tube 1d is canceled with the elongation of 0.09% of the optical fiber cable 5, a difference between the lengths of these members, i.e., an extra length, becomes 0%.

Figure 14:
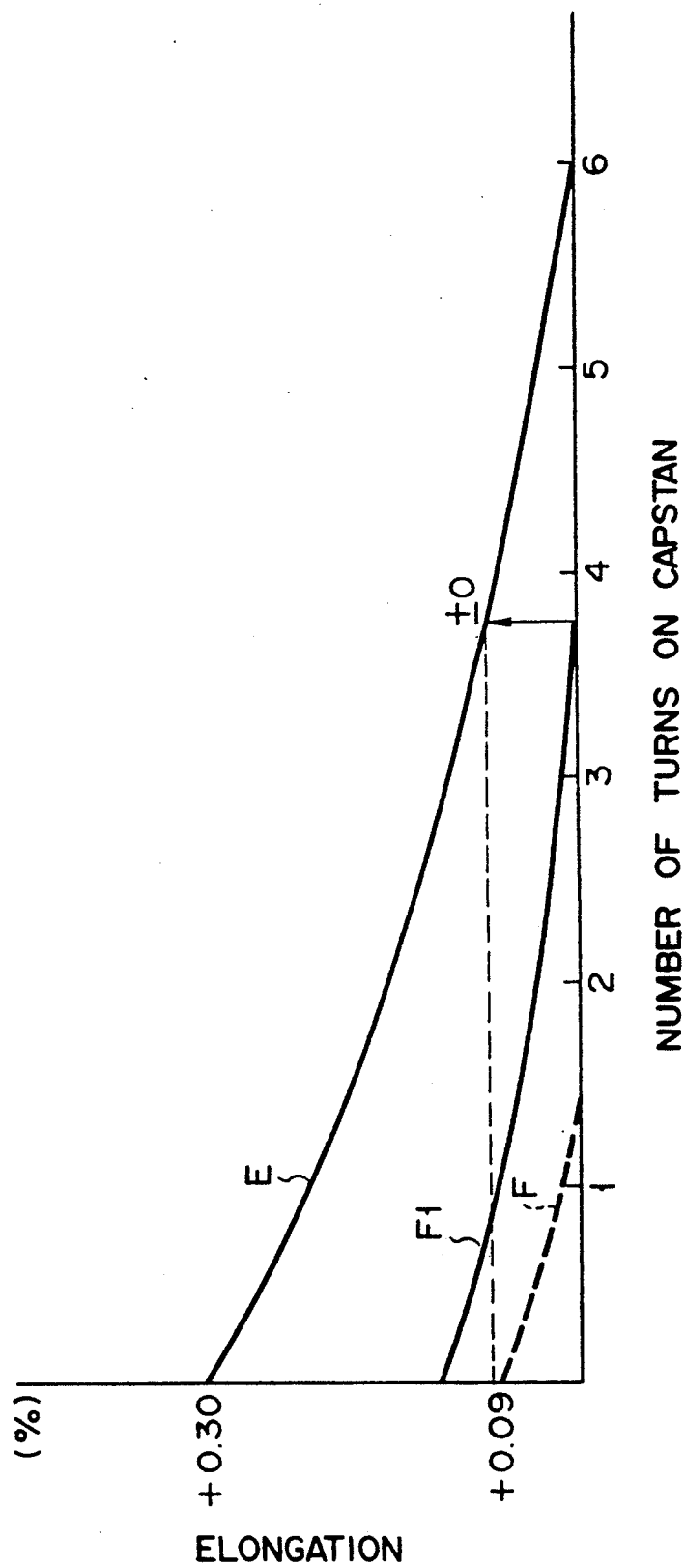
Figure 15:
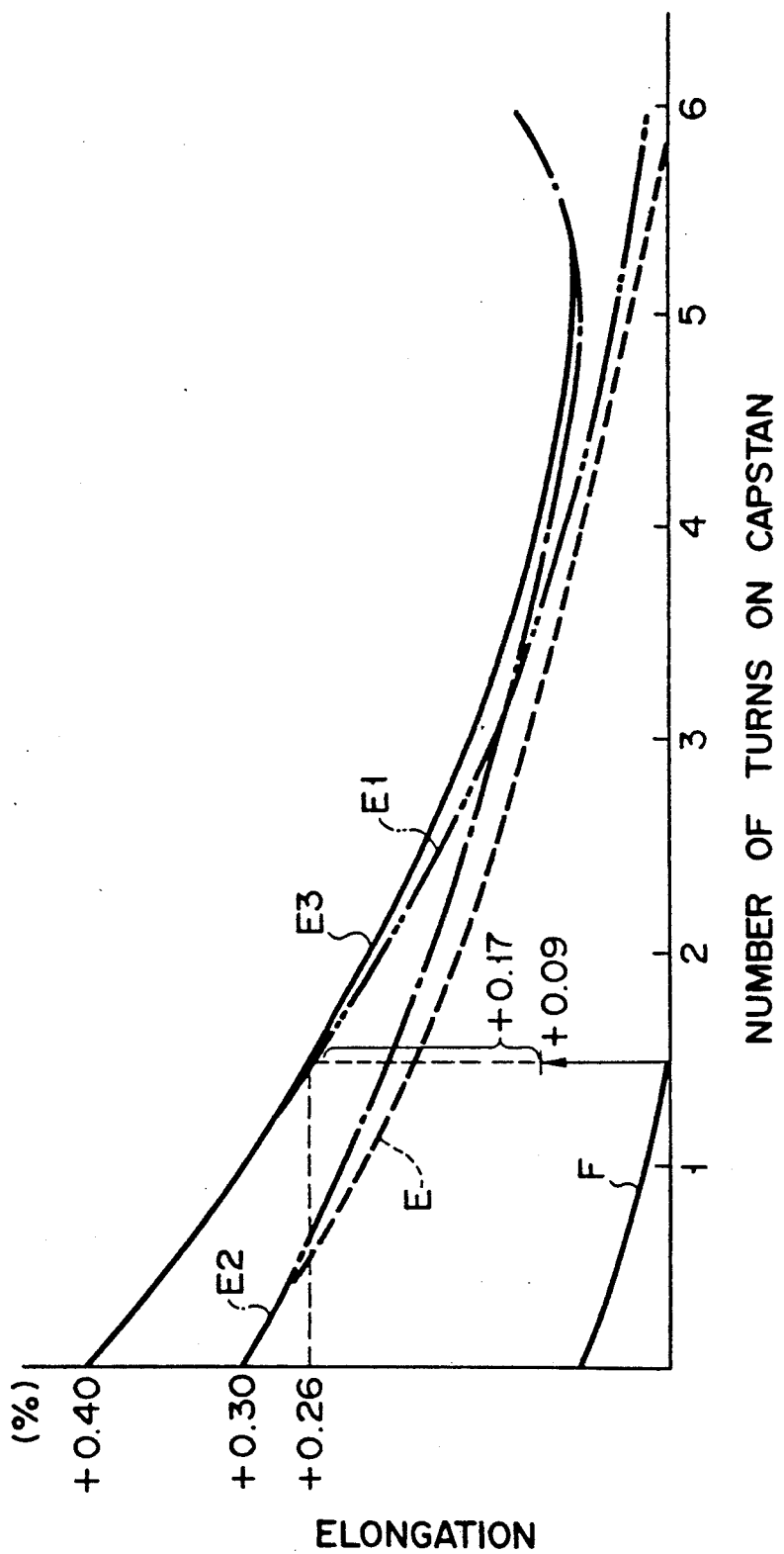

Contrary to the case in FIG. 14, when a tension of the metal tube 1d at the inlet side of the capstan 11a is increased by applying a tension of the metal strip 1 by the tension adjusting means while the tension of the optical fiber cable 5 at the inlet of the capstan 11a is kept unchanged, a change in elongation in metal tube 1d is represented by a curve E1 in FIG. 15.

Assume that the tension of the metal tube 1d at the inlet side of the capstan 11a is set equal to that in FIG. 13, and that a tension of the metal tube 1d at the outlet sides of the capstans 11a and 11b are increased by the tension adjusting means 13. In this case, a change in elongation of the metal tube 1d is represented by a curve E2 in FIG. 15. A curve E3 in FIG. 15 represents a case wherein the tensions of the metal tube 1d at the inlet and outlet sides of the capstans 11a and 11b are increased.

As described above, one or both of the tensions of the metal tube 1d at the inlet and outlet sides of the capstans 11a and 11b are increased, or both the tensions are increased by a predetermined value. In this case, the length of the optical fiber cable 5 can be larger than that of the metal tube 1d by a desired amount. For example, as indicated by the curve E3, when the metal tube 1d is wound around the capstans 11a and 11b by one and half times, the elongation of the metal tube 1d becomes +0.26%. Even if the elongation of 0.09% of the optical fiber cable 5, which is caused by the winding diameter, is subtracted from the elongation of the metal tube 1d, the optical fiber cable 5 is longer than the metal tube 1d by 0.17% at the outlet side of the capstan.

Figure 16:
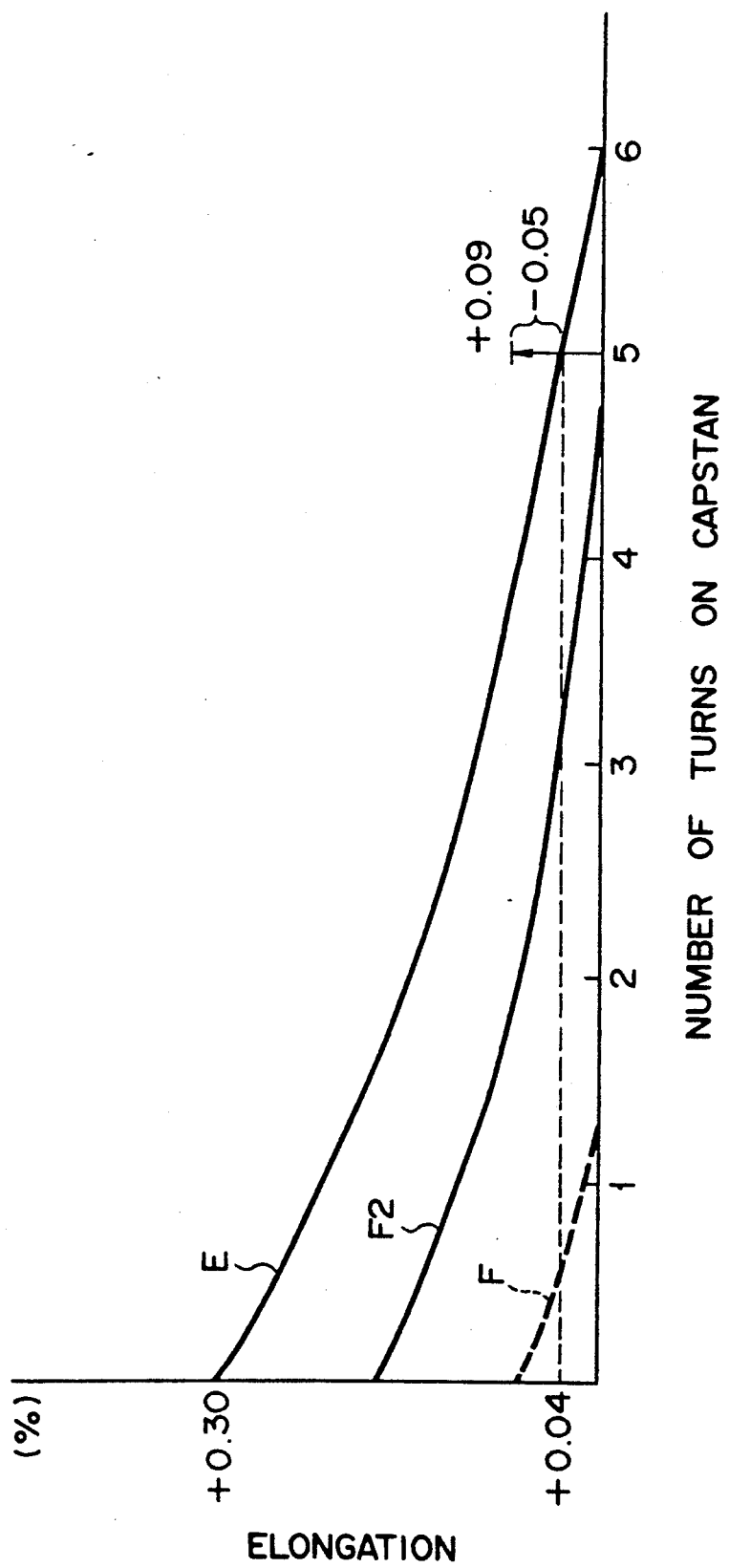

When a tension of the optical fiber cable 5 at the inlet side of the capstan is set larger than that in FIG. 14, and a change in elongation of the optical fiber cable 5 is represented by a curve F2 in FIG. 16, the length of the optical fiber cable 5 can be set smaller than that of the metal tube 1d. In this case, the elongation of the optical fiber cable 5 becomes almost zero in 5-time winding, and the corresponding elongation of the metal tube 1d becomes +0.04%. This elongation of +0.04% is subtracted from the winding difference of 0.09% in the optical fiber cable 5. Therefore, the optical fiber cable 5 can be set shorter than the metal tube 1d by 0.05%.

As described above, by systematically adjusting the capstans 11a and 11b wound with the metal tube covered optical fiber cable 12 by a plurality of times, the tension adjusting means 14 for the metal strip 1, and the tension adjusting means 15 for the optical fiber cable 5, and occasionally the tension adjusting means 13 in the downstream of the capstans 11a and 11b, the length of the optical fiber cable 5 relative to the metal tube 1d can be arbitrarily adjusted. When the tensions of the metal tubes 1c and 1d are adjusted by adjusting the positioning unit 71 as in the tension adjusting means 14 for the metal strip 1, extra length control can be more precisely performed. In this case, the extra length control function of the positioning unit 71 is the same as that of the tension adjusting means 14 of the metal strip, and a detailed description thereof will not be made.

As described above, the metal tube covered optical fiber cable 12 is manufactured while the extra length is controlled to a predetermined length.

In the above embodiment, argon gas is used as an inert gas. However, nitrogen gas may be used to obtain the same effect as described above.

In the above embodiment, a gel is not supplied to a metal tube for covering the optical fiber cable. When the gel is supplied to the metal tube, a gel is supplied from the insert gas supply tube 63 in the optical fiber cable guide means 6. In this manner, the gel can be supplied to the metal tube 1d by utilizing only one guide tube 61.

In this case, the inert gas and gel are supplied at a pressure which does not apply a tension on the optical fiber cable 5 by the inert gas or gel flow because insertion of the optical fiber cable 5 and extra length control can be achieved, as they are desired, without supplying the inert gas and gel through the optical fiber cable guide means 6.

Figure 17:
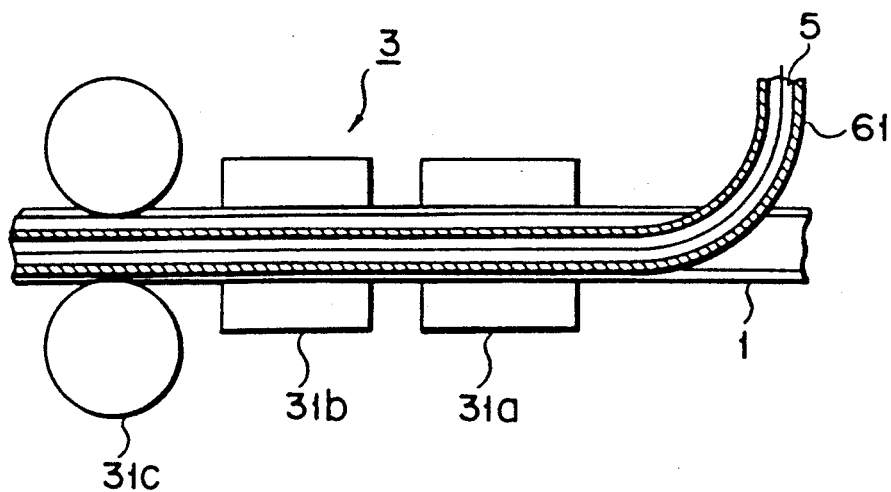
FIG. 17 is a view showing a part of another layout of the optical fiber guide means.

In the above embodiment, the optical fiber cable guide means 6 is arranged between the first and second assemblies 3a and 4 of the assembly 2. However, as shown in FIG. 17, the optical fiber cable guide means may be arranged at the inlet of the first assembly 3, and the guide tube 61 may be inserted at the inlet of the first forming roller pair 31a.

Figure 18:
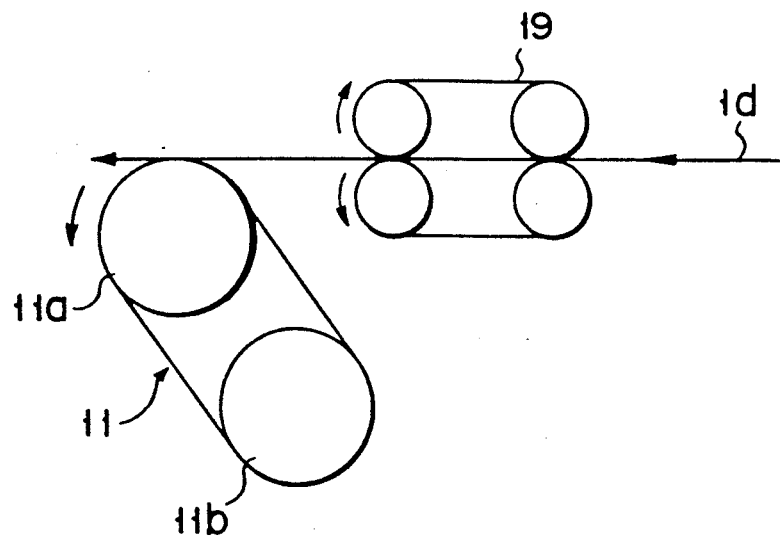
FIG. 18 is a view showing part of another embodiment.

In the above embodiment, the traction means comprising the capstans 11a and 11b of the direct tension variable means 11 and the tension adjusting means 13 is arranged in the downstream of the drawing means 9, and the tensions of the optical fiber cable 5 at the inlet and outlet sides of the capstans 11a and 11b and the tension of the optical fiber cable at the inlet side of the capstans are adjusted by the capstans 11a and 11b and the tension adjusting means 14, 15, and 13 while traction of the metal tube covered optical fiber cable 12 is kept performed, thereby performing extra length control. However, as shown in FIG. 18, a pulling means 19 for pulling the metal tube 1d may be arranged at the inlet sides of the capstans 11a and 11b in the traction means to arbitrarily adjust the tension of the metal tube 1d at the inlet side of the capstans.

For example, an endless capstan may be used as the pulling means 19, and the metal tube 1d is pulled while being clamped between the endless capstans, so that the metal tube 1d can be pulled with a tension required in a forming schedule. By adjusting a feed speed of the endless capstan, the tension of the metal tube 1d supplied to the capstan 11a can be arbitrarily controlled.

For example, when the length of the optical fiber cable 5 is set smaller than that of the metal tube 1d, in the case of FIG. 16, since a tension of the metal tube 1d at the inlet side of the capstan 11a cannot be reduced due to a forming schedule, a tension of the optical fiber cable 5 at the inlet side is increased. However, an excessive increase in tension of the optical fiber cable is not preferable. A tension of the metal tube 1d at the inlet side is decreased to obtain an effect wherein a tension of the optical fiber cable 5 is relatively increased. Therefore, the length of the optical fiber cable 5 can be reduced without applying an excessive force to the optical fiber cable 5.

After the metal tube covered optical fiber cable 5 is manufactured and is to be fabricated in the subsequent process, an actual extra length may become different from a target extra length. In this case, extra length control is also required. When the extra length control is performed in advance in consideration of a deviation in extra length value, a metal tube covered optical fiber cable having an optimal extra length after the subsequent fabrication can be obtained.

In each embodiment described above, one optical fiber cable is inserted into a metal tube. However, an optical fiber bundle consisting of a plurality of optical fibers can also be guided into a metal tube in the same manner as described above.

As described above, according to the present invention, an optical fiber cable is guided into a metal tube by a guide tube also serving as a heat-insulating member, and the guide tube is brought into contact with the inner wall of the metal tube at a position opposite to the abutment portions of the metal tube. The optical fiber cable can be cooled by an inert gas blown into the guide tube. An increase in temperature of the optical fiber cable at the laser welding portion of the metal tube can be suppressed, and thermal damage to the optical fiber cable can be prevented. Therefore, a high-quality metal tube covered optical fiber cable can be manufactured.

The guide tube is located in the laser welding portion at a position opposite to the abutment portions of the metal tube, and a gap is formed between the abutment portions and the guide tube so that a space in which sputter components produced during welding can be deposited can be assured. Therefore, the metal tube can be continuously welded for a long period of time.

When the abutment portions of the metal tube are to be welded, the metal tube is held and positioned by the engaging groove of each guide shoe, and the guide shoe position can be finely adjusted in correspondence with the focal position of the laser beam. Therefore, since the abutment portions of the metal tube can be accurately positioned, the abutment portions of the metal tube can be highly precisely welded.

The focal position of the laser beam for welding the abutment portions of the metal tube is shifted outside the range of the abutment portions and is moved inside the metal tube, an excessive increase in radiation power density of the laser beam can be prevented, and at the same time the welding width can be set almost constant. Therefore, welding free from defects in the abutment portions of the metal tube can be performed.

The focal point shift amount of the laser beam is given as a predetermined value determined by the power of the radiation laser beam and the welding rate determined not to produce nonwelded portions. The rear bead width can fall within the predetermined range accordingly, and production of sputter components can be suppressed. Therefore, an operation can be stably performed for a long period of time.

The tensions at the inlet and outlet of the capstans serving as the tension variable means can be adjusted by the tension of the metal strip formed into a metal tube, and the tension of the metal tube covered optical fiber cable to cause a difference between the tension of the sealed metal tube wound around the capstans and the tension of the optical fiber cable incorporated in the metal tube. Therefore, the length of the optical fiber cable relative to the metal tube can be arbitrarily adjusted in accordance with application conditions, and the metal tube covered optical fiber cable can be stably installed and used.

When a gel is to be supplied in the metal tube, it can be supplied through the guide tube which guides the optical fiber cable, only one guide tube is inserted into the metal tube. A small-diameter metal tube can be used, and the diameter of the metal tube can be easily reduced in correspondence with the diameter of the optical fiber cable. Further, the guide tube can be easily drawn, since the guide tube does not extend up to the drawing means.

We claim:

1. An apparatus for manufacturing a metal tube covered optical fiber cable, comprising:

optical fiber guide means for guiding an optical fiber into a metal tube while said metal tube is drawn under traction and which metal tube is to be sealed by welding means, said optical fiber guide means comprising:

a guide tube, inserted into said metal tube, for guiding said at least one optical fiber into said metal tube; and means for elastically urging said guide tube against an inner wall surface of said metal tube at a position opposite to a welding surface of said metal tube.

2. An apparatus for manufacturing a metal tube covered optical fiber cable according to claim 1, wherein said guide tube guides an optical fiber bundle into said metal tube.

3. An apparatus for manufacturing a metal tube covered optical fiber cable according to claim 1, wherein said optical fiber guide means further comprises an inert gas tube connected between an inlet port of the optical fiber and a metal tube insertion port.

4. An apparatus for manufacturing a metal tube covered optical fiber cable according to claim 1, wherein said optical fiber guide means further comprises a filler tube connected between an inlet port of the optical fiber and a metal tube insertion port.

5. An apparatus for manufacturing a metal tube covered optical fiber cable according to claim 1, wherein said welding means comprises laser welding means.

6. An apparatus for manufacturing a metal tube covered optical fiber cable according to claim 5, wherein said welding means is positioned to cause a focal point of a laser beam thereof to fall below abutment portions of said metal tube which is to be welded.

7. An apparatus for manufacturing a metal tube covered optical fiber cable according to claim 6, wherein a focal point shift amount of said laser beam is determined to fall within a predetermined range determined by a laser beam power and a welding rate which does not produce a non-welded portion.

8. An apparatus for manufacturing a metal tube covered optical fiber cable, comprising:
  forming means for receiving a metal strip having two side edges, and for causing both sides edges of said metal strip to abut against each other while said metal strip is drawn under traction to thereby form said metal strip into a metal tube;
  optical fiber guide means for guiding at least one optical fiber into said formed metal tube while said metal tube is drawn under traction, said optical fiber guide means comprising:
    a guide tube, inserted into said metal tube, for guiding said at least one optical fiber into said metal tube; and
    means for electrically urging said guide tube against an inner wall surface of said metal tube at a position opposite to a welding surface of said metal tube;
  welding means for melting and sealing abutment portions of said metal tube with a laser beam; and
  extra length adjusting means for controlling an extra length of said at least one optical fiber cable relative to said metal tube, said extra length adjusting means comprising:
    fiber tension adjusting means, arrange upstream of said optical fiber guide means, for adjusting optical fiber tension; and
    a rotary drum, arranged downstream of said optical fiber guide means, for controlling winding tensions of said metal tube and said at least one optical fiber to gradually reduce the tensions.

9. An apparatus for manufacturing a metal tube covered optical fiber cable according to claim 8, wherein said at least one optical fiber comprises an optical fiber bundle.

10. An apparatus for manufacturing a metal tube covered optical fiber cable according to claim 8, wherein said optical fiber guide means further comprises a filler tube connected between an inlet port of the optical fiber and a metal tube insertion port.

11. An apparatus for manufacturing a metal tube covered optical fiber cable according to claim 8, wherein said welding means is positioned to cause a focal point of a laser beam thereof to fall below said abutment portions of the metal tube.

12. An apparatus for manufacturing a metal tube covered optical fiber cable according to claim 8, wherein a focal point shift amount of a laser beam of said welding means is determined to fall within a predetermined range determined by a laser beam power and a welding rate which does not produce a non-welded portion.

13. An apparatus for manufacturing a metal tube covered optical fiber cable according to claim 8, wherein said welding means comprises position adjusting means for positioning said abutment portions of said metal tube to a predetermined position with respect to a laser beam radiation position and a path line of said metal line.

14. An apparatus for manufacturing a metal tube covered optical fiber cable according to claim 8, wherein said rotary drum of said extra length adjusting means comprises a capstan for drawing said metal tube and the optical fiber under traction.

15. An apparatus for manufacturing a metal tube covered optical fiber cable according to claim 8, wherein said extra length adjusting means further comprises an endless capstan arranged upstream of said rotary drum.

16. An apparatus for manufacturing a metal tube covered optical fiber cable according to claim 8, wherein said extra length adjusting means further comprises means for adjusting a tension of said metal tube downstream of said rotary drum.

17. An apparatus for manufacturing a metal tube covered optical fiber cable according to claim 8, wherein said extra length adjusting means further comprises means for adjusting a tension of the metal strip upstream of said forming means.

18. An apparatus for manufacturing a metal tube covered optical fiber cable according to claim 8, wherein said optical fiber guide means further comprises an inert gas tube connected between an inlet port of the optical fiber and a metal tube insertion port.

19. An apparatus for manufacturing a metal tube covered optical fiber cable according to claim 18, wherein said welding means is positioned to cause a focal point of a laser beam thereof to fall below said abutment portions of the metal tube.

20. An apparatus for manufacturing a metal tube covered optical fiber cable according to claim 19, wherein a focal point shift amount of said laser beam is determined to fall within a predetermined range determined by a laser beam power and a welding rate which does not produce a non-welded portion.

21. An apparatus for manufacturing a metal tube covered optical fiber cable according to claim 20, wherein said welding means comprises position adjusting means for positioning said abutment portions of said metal tube to a predetermined position with respect to a laser beam radiation position and a path line of said metal tube.

22. An apparatus for manufacturing a metal tube covered optical fiber cable according to claim 21, wherein said rotary drum of said extra length adjusting means comprises a capstan for drawing said metal tube and the optical fiber under traction.

23. An apparatus for manufacturing a metal tube covered optical fiber cable according to claim 22, wherein said extra length adjusting means further comprises an endless capstan arranged upstream of said rotary drum.

24. An apparatus for manufacturing a metal tube covered optical fiber cable according to claim 23, wherein said extra length adjusting means further comprises means for adjusting a tension of said metal tube downstream of said rotary drum.

25. An apparatus for manufacturing a metal tube covered optical fiber cable according to claim 24, wherein said extra length adjusting means further comprises means for adjusting a tension of the metal strip upstream of said forming means.

26. An apparatus for welding a metal tube by laser radiation, wherein a metal strip substantially in the shape of a cylinder and having a longitudinal gap between longitudinal side edge portions thereof is subjected to traction, said apparatus comprising:
laser welding means for sealing the gap of said metal strip, a guide shoe having a groove engaged with one side edge portion of said metal strip, and positioning means for positioning said guide shoe to a predetermined position with respect to a laser beam focal position and a path line of said metal strip.

27. An apparatus for welding a metal tube by laser radiation according to claim 26, wherein said positioning means comprises an actuator for finely adjusting a position of the gap of said metal strip horizontally, and an actuator for finely adjusting a position of the gap vertically.

28. An apparatus for welding a metal tube by laser radiation according to claim 26, wherein said guide shoe comprises a plurality of guide shoes, and wherein said apparatus further comprises a monitor, arranged between said plurality of guide shoes, for observing the gap of said metal strip.

29. An apparatus for welding a metal tube by laser radiation according to claim 26, wherein said positioning means is located between stationary rolls for supporting said metal strip upstream and downstream of said positioning means, and fixes said guide shoe at a slightly upper or lower position with respect to the path line of the metal strip.

30. An apparatus for welding a metal tube by laser radiation according to claim 29, wherein said positioning means comprises an actuator for finely adjusting a position of the gap of said metal strip horizontally, and an actuator for finely adjusting a position of the gap vertically.

31. An apparatus for welding a metal tube by laser radiation according to claim 30, wherein said guide shoe comprises a plurality of guide shoes, and wherein said apparatus further comprises a monitor, arranged between said plurality of guide shoes, for observing the gap of said metal strip.

32. A method of manufacturing a metal tube covered optical fiber cable, comprising the steps of forming a metal strip which is to be sealed to form a metal tube, and guiding at least one optical fiber into said metal tube, wherein the optical fiber is guided into said metal tube through a guide tube which is inserted into said metal tube and which is elastically urged against an inner wall surface of said metal tube at a position opposite to a welding surface.

33. A method of manufacturing a metal tube covered optical fiber cable according to claim 32, wherein said at least one optical fiber comprises an optical fiber bundle.

34. A method of manufacturing a metal tube covered optical fiber cable, comprising the steps of:
causing the side edges of a metal strip subjected to traction to abut against each other;
forming the metal strip into a metal tube;
guiding at least one optical fiber into said metal tube through a guide tube which is inserted into the metal tube and elastically urged against an inner wall at a position opposite to a laser beam radiation surface;
welding the abutment portions of said metal tube to seal said metal tube; and
adjusting an extra length of the optical fiber relative to the metal tube by controlling winding tensions of said metal tube and the at least one optical fiber to gradually reduce the tensions, and by adjusting the tension of the at least one optical fiber.

35. A method of manufacturing a metal tube covered optical fiber cable according to claim 34, wherein said at least one optical fiber comprises an optical fiber bundle.

36. A method of manufacturing a metal tube covered optical fiber cable according to claim 34, wherein said step of welding comprises sealed said metal tube by laser welding means.

37. A method of manufacturing a metal tube covered optical fiber cable according to claim 36, wherein a focal point of a laser beam of said laser welding means is positioned to fall below abutment portions of said metal tube.

38. A method of manufacturing a metal tube covered optical fiber cable according to claim 37, wherein a focal point shift amount of said laser beam is determined to fall within a predetermined range determined by a laser beam power and a welding rate which does not produce a non-welded portion.

39. A method of manufacturing a metal tube covered optical fiber cable according to claim 38, wherein the abutment portions of said metal tube are positioned to a predetermined position with respect to a laser beam focal position and path line of the metal tube.

40. A method of manufacturing a metal tube covered optical fiber cable according to claim 34, wherein said step of guiding at least one optical fiber comprises simultaneously guiding the optical fiber and an inert gas into said metal tube through a single guide tube.

41. A method of manufacturing a metal tube covered optical fiber cable according to claim 34, wherein said step of guiding at least one optical fiber comprises simultaneously guiding the optical fiber and a filler into said metal tube through a single guide tube.

42. A method of manufacturing a metal tube covered optical fiber cable according to claim 34, wherein said step of welding the abutment portions of said metal tube to seal said metal tube comprises laser welding to form a metal tube having a rear bead width b in $\mu m$ within the range of $$(10d-5) \leq b \leq 1000 \ (t/2),$$

where d and t are respectively an outer diameter in mm and thickness in mm of the metal tube.

43. A method of manufacturing a metal tube covered optical fiber cable according to claim 34, wherein said step of welding the abutment portions of said metal tube to seal said metal tube comprises laser welding and wherein at least one of a beam power, a welding rate, and a focal point shifting amount is adjusted such that a rear bead width in b μm of the sealed metal tube is within the range of $(10d-5) \leq b \leq 1000 \ (t/2),$ where d and t are respectively an outer diameter in mm and thickness in mm of the metal tube.

44. A metal tube covered optical fiber cable comprising at least one optical fiber that is covered by a metal tube, formed from a metal strip that is substantially in the shape of a cylinder and whose unsealed portion is sealed by welding, said sealed metal tube covered optical fiber cable having a rear bead width b in μm within the range of $(10d-5) \leq b \leq 1000 \ (t/2),$ where d and t are respectively an outer diameter in mm and a thickness in mm of the metal tube.

45. A metal tube covered optical fiber cable according to claim 44, wherein said at least one optical fiber comprises an optical fiber cable.

* * * * *